(12) United States Patent
Hampson et al.

(10) Patent No.: US 11,060,276 B2
(45) Date of Patent: Jul. 13, 2021

(54) BINDERS

(71) Applicant: KNAUF INSULATION SPRL, Visé (BE)

(72) Inventors: Carl Hampson, St. Helens-Merseyside (GB); Oliver Callaghan, St. Helens-Merseyside (GB)

(*) Notice: Subject to any disclaimer, the term of this patent is extended or adjusted under 35 U.S.C. 154(b) by 340 days.

(21) Appl. No.: 16/308,263

(22) PCT Filed: May 31, 2017

(86) PCT No.: PCT/EP2017/063147
§ 371 (c)(1),
(2) Date: Dec. 7, 2018

(87) PCT Pub. No.: WO2017/211642
PCT Pub. Date: Dec. 14, 2017

(65) Prior Publication Data
US 2019/0257078 A1  Aug. 22, 2019

(30) Foreign Application Priority Data

Jun. 9, 2016 (GB) ..................... 1610063

(51) Int. Cl.
*E04B 1/76* (2006.01)
*B27K 3/32* (2006.01)
(Continued)

(52) U.S. Cl.
CPC ............ *E04B 1/7658* (2013.01); *B27K 3/32* (2013.01); *C08L 5/00* (2013.01); *C08L 79/02* (2013.01);
(Continued)

(58) Field of Classification Search
CPC ............... C08J 2301/08; C08J 2303/02; C08J 2303/04; C08J 2305/00; C08J 2379/02;
(Continued)

(56) References Cited

U.S. PATENT DOCUMENTS 1,801,052 A   4/1931  Meigs
1,801,053 A   4/1931  Meigs
(Continued)

FOREIGN PATENT DOCUMENTS

AU     8538765     8/1985
AU     9640921     7/1997
(Continued)

OTHER PUBLICATIONS

International Search Report and Written Opinion for PCT/US2008/059730, completed Sep. 22, 2008.
(Continued)

*Primary Examiner* — Camie S Thompson
(74) *Attorney, Agent, or Firm* — Knauf Insulation, Inc.; James K. Blodgett; Brandon N. Hudder

(57) ABSTRACT

The invention relates to an aqueous binder composition comprising a carbohydrate component, possibly a crosslinker and possibly reaction product of carbohydrate component with crosslinker, further comprising a phenalkamine. The invention further discloses binders obtained therefrom and composite products manufactured therewith.

16 Claims, 3 Drawing Sheets

(51) Int. Cl.
  *C08L 5/00* (2006.01)
  *C08L 79/02* (2006.01)
  *C08L 83/04* (2006.01)
  *E04C 2/16* (2006.01)
  *C09J 11/06* (2006.01)
  *C08K 5/1545* (2006.01)
  *C08K 5/17* (2006.01)
  *E04B 1/74* (2006.01)

(52) U.S. Cl.
  CPC .......... *C08L 83/04* (2013.01); *C09J 11/06* (2013.01); *C08J 2305/00* (2013.01); *C08K 5/1545* (2013.01); *C08K 5/17* (2013.01); *C08L 2312/00* (2013.01); *C09J 2405/00* (2013.01); *E04B 2001/742* (2013.01)

(58) Field of Classification Search
  CPC ....... C08J 5/043; C08J 5/24; C08J 5/04; C08J 5/045; C08K 5/17; C08K 7/02; C08L 5/00; C08L 79/02; C08L 97/02; C08L 3/04; C09J 2405/00; C09J 101/02; C09J 101/08; C09J 179/02; C09J 103/04; C09J 2479/02; E04C 2/16; E04B 1/7658; E04B 2001/7683; B29C 65/165; B29C 70/06; B27N 3/002; B27N 3/02; C08G 12/00; B29K 2405/00; B29K 2508/08; B29K 2995/0002; B29K 2995/0015; Y10T 428/31975; B32B 21/02; B29L 2023/225
  USPC .............. 428/297.4, 426; 252/62; 427/289.8, 427/289.9, 393; 156/328; 435/184; 523/145; 536/55, 18.7, 55.1; 106/217.6, 106/162.1, 162.9, 163.01; 527/312
  See application file for complete search history.

(56) References Cited

U.S. PATENT DOCUMENTS

| | | |
|---|---|---|
| 1,886,353 A | 11/1932 | Novotny et al. |
| 1,902,948 A | 3/1933 | Castle |
| 1,964,263 A | 6/1934 | Krenke |
| 2,198,874 A | 4/1940 | Leighton |
| 2,215,825 A | 9/1940 | Wallace et al. |
| 2,261,295 A | 11/1941 | Schlack |
| 2,362,086 A | 11/1944 | Eastes et al. |
| 2,371,990 A | 3/1945 | Hanford |
| 2,392,105 A | 1/1946 | Sussman |
| 2,442,989 A | 6/1948 | Sussman |
| 2,500,665 A | 3/1950 | Courtright |
| 2,518,956 A | 8/1950 | Sussman |
| 2,875,073 A | 2/1959 | Gogek |
| 2,894,920 A | 7/1959 | Ramos |
| 2,965,504 A | 12/1960 | Gogek |
| 3,038,462 A | 6/1962 | Bohdan |
| 3,138,473 A | 6/1964 | Floyd et al. |
| 3,222,243 A | 12/1965 | Gaston et al. |
| 3,231,349 A | 1/1966 | Stalego |
| 3,232,821 A | 2/1966 | Banks et al. |
| 3,297,419 A | 1/1967 | Eyre, Jr. |
| 3,513,001 A | 5/1970 | Woodhead et al. |
| 3,551,365 A | 12/1970 | Matalon |
| 3,784,408 A | 1/1974 | Jaffe et al. |
| 3,791,807 A | 2/1974 | Etzel et al. |
| 3,802,897 A | 4/1974 | Bovier et al. |
| 3,809,664 A | 5/1974 | Burr et al. |
| 3,826,767 A | 7/1974 | Hoover et al. |
| 3,856,606 A | 12/1974 | Fan |
| 3,867,119 A | 2/1975 | Takeo et al. |
| 3,907,724 A | 9/1975 | Higginbottom |
| 3,911,048 A | 10/1975 | Nistri et al. |
| 3,919,134 A | 11/1975 | Higginbottom |
| 3,922,466 A | 11/1975 | Bell et al. |
| 3,955,031 A | 5/1976 | Jones et al. |
| 3,956,204 A | 5/1976 | Higginbottom |
| 3,961,081 A | 6/1976 | McKenzie |
| 3,971,807 A | 7/1976 | Brack |
| 4,014,726 A | 3/1977 | Fargo |
| 4,028,290 A | 6/1977 | Reid |
| 4,048,127 A | 9/1977 | Gibbons et al. |
| 4,054,713 A | 10/1977 | Sakaguchi et al. |
| 4,085,076 A | 4/1978 | Gibbons et al. |
| 4,097,427 A | 6/1978 | Aitken et al. |
| 4,107,379 A | 8/1978 | Stofko |
| 4,109,057 A | 8/1978 | Nakamura et al. |
| 4,144,027 A | 3/1979 | Habib |
| 4,148,765 A | 4/1979 | Nelson |
| 4,183,997 A | 1/1980 | Stofko |
| 4,184,986 A | 1/1980 | Krasnobajew et al. |
| 4,186,053 A | 1/1980 | Krasnobajew et al. |
| 4,201,247 A | 5/1980 | Shannon |
| 4,201,857 A | 5/1980 | Krasnobajew et al. |
| 4,217,414 A | 8/1980 | Walon |
| 4,233,432 A | 11/1980 | Curtis, Jr. |
| 4,246,367 A | 1/1981 | Curtis, Jr. |
| 4,259,190 A | 3/1981 | Fahey |
| 4,265,963 A | 5/1981 | Matalon |
| 4,278,573 A | 7/1981 | Tessler |
| 4,296,173 A | 10/1981 | Fahey |
| 4,301,310 A | 11/1981 | Wagner |
| 4,310,585 A | 1/1982 | Shannon |
| 4,322,523 A | 3/1982 | Wagner |
| 4,330,443 A | 5/1982 | Rankin |
| 4,333,484 A | 6/1982 | Keritsis |
| 4,357,194 A | 11/1982 | Stofko |
| 4,361,588 A | 11/1982 | Herz |
| 4,379,101 A | 4/1983 | Smith |
| 4,393,019 A | 7/1983 | Geimer |
| 4,396,430 A | 8/1983 | Matalon |
| 4,400,496 A | 8/1983 | Butler et al. |
| 4,464,523 A | 8/1984 | Neigel et al. |
| 4,506,684 A | 3/1985 | Keritsis |
| 4,520,143 A | 5/1985 | Jellinek |
| 4,524,164 A | 6/1985 | Viswanathan et al. |
| 4,631,226 A | 12/1986 | Jellinek |
| 4,654,259 A | 3/1987 | Stofko |
| 4,668,716 A | 5/1987 | Pepe et al. |
| 4,692,478 A | 9/1987 | Viswanathan et al. |
| 4,714,727 A | 12/1987 | Hume, III |
| 4,720,295 A | 1/1988 | Bronshtein |
| 4,734,996 A | 4/1988 | Kim et al. |
| 4,754,056 A | 6/1988 | Ansel et al. |
| 4,761,184 A | 8/1988 | Markessini |
| 4,780,339 A | 10/1988 | Lacourse et al. |
| 4,828,643 A | 5/1989 | Newman et al. |
| 4,845,162 A | 7/1989 | Schmitt et al. |
| 4,906,237 A | 3/1990 | Johansson et al. |
| 4,912,147 A | 3/1990 | Pfoehler et al. |
| 4,918,861 A | 4/1990 | Carpenter et al. |
| 4,923,980 A | 5/1990 | Blomberg |
| 4,950,444 A | 8/1990 | Deboufie et al. |
| 4,988,780 A | 1/1991 | Das et al. |
| 4,992,519 A | 2/1991 | Mukherjee |
| 5,001,202 A | 3/1991 | Denis et al. |
| 5,013,405 A | 5/1991 | Izard |
| 5,032,431 A | 7/1991 | Conner et al. |
| 5,037,930 A | 8/1991 | Shih |
| 5,041,595 A | 8/1991 | Yang et al. |
| 5,089,342 A | 2/1992 | Dhein et al. |
| 5,095,054 A | 3/1992 | Lay et al. |
| 5,106,615 A | 4/1992 | Dikstein |
| 5,114,004 A | 5/1992 | Isono et al. |
| 5,123,949 A | 6/1992 | Thiessen |
| 5,124,369 A | 6/1992 | Vandichel et al. |
| 5,128,407 A | 7/1992 | Layton et al. |
| 5,143,582 A | 9/1992 | Arkens et al. |
| 5,151,465 A | 9/1992 | Le-Khac |
| 5,167,738 A | 12/1992 | Bichot et al. |
| 5,198,492 A | 3/1993 | Stack |
| 5,217,741 A | 6/1993 | Kawachi et al. |
| 5,218,048 A | 6/1993 | Abe et al. |
| 5,240,498 A | 8/1993 | Matalon et al. |
| 5,278,222 A | 1/1994 | Stack |

(56) References Cited

U.S. PATENT DOCUMENTS

| | | |
|---|---|---|
| 5,300,144 A | 4/1994 | Adams |
| 5,300,192 A | 4/1994 | Hansen et al. |
| 5,308,896 A | 5/1994 | Hansen et al. |
| 5,318,990 A | 6/1994 | Strauss |
| 5,336,753 A | 8/1994 | Jung et al. |
| 5,336,755 A | 8/1994 | Pape |
| 5,336,766 A | 8/1994 | Koga et al. |
| 5,340,868 A | 8/1994 | Strauss et al. |
| 5,352,480 A | 10/1994 | Hansen et al. |
| 5,367,849 A | 11/1994 | Bullock |
| 5,371,194 A | 12/1994 | Ferretti |
| 5,387,665 A | 2/1995 | Misawa et al. |
| 5,389,716 A | 2/1995 | Graves |
| 5,393,849 A | 2/1995 | Srinivasan et al. |
| 5,416,139 A | 5/1995 | Zeiszler |
| 5,421,838 A | 6/1995 | Gosset et al. |
| 5,424,418 A | 6/1995 | Duflot |
| 5,434,233 A | 7/1995 | Kiely et al. |
| 5,447,977 A | 9/1995 | Hansen et al. |
| 5,470,843 A | 11/1995 | Stahl et al. |
| 5,480,973 A | 1/1996 | Goodlad et al. |
| 5,492,756 A | 2/1996 | Seale et al. |
| 5,498,662 A | 3/1996 | Tanaka et al. |
| 5,503,920 A | 4/1996 | Alkire et al. |
| 5,534,612 A | 7/1996 | Taylor et al. |
| 5,536,766 A | 7/1996 | Seyffer et al. |
| 5,538,783 A | 7/1996 | Hansen et al. |
| 5,543,215 A | 8/1996 | Hansen et al. |
| 5,545,279 A | 8/1996 | Hall et al. |
| 5,547,541 A | 8/1996 | Hansen et al. |
| 5,547,745 A | 8/1996 | Hansen et al. |
| 5,550,189 A | 8/1996 | Qin et al. |
| 5,554,730 A | 9/1996 | Woiszwillo et al. |
| 5,562,740 A | 10/1996 | Cook et al. |
| 5,571,618 A | 11/1996 | Hansen et al. |
| 5,578,678 A | 11/1996 | Hartmann et al. |
| 5,580,856 A | 12/1996 | Prestrelski et al. |
| 5,582,682 A | 12/1996 | Ferretti |
| 5,583,193 A | 12/1996 | Aravindakshan et al. |
| 5,589,256 A | 12/1996 | Hansen et al. |
| 5,589,536 A | 12/1996 | Golino et al. |
| 5,607,759 A | 3/1997 | Hansen et al. |
| 5,608,011 A | 3/1997 | Eck et al. |
| 5,609,727 A | 3/1997 | Hansen et al. |
| 5,614,570 A | 3/1997 | Hansen et al. |
| 5,620,940 A | 4/1997 | Birbara et al. |
| 5,621,026 A | 4/1997 | Tanaka et al. |
| 5,633,298 A | 5/1997 | Arfaei et al. |
| 5,641,561 A | 6/1997 | Hansen et al. |
| 5,643,978 A | 7/1997 | Darwin et al. |
| 5,645,756 A | 7/1997 | Dubin et al. |
| 5,660,904 A | 8/1997 | Andersen et al. |
| 5,661,213 A | 8/1997 | Arkens et al. |
| 5,670,585 A | 9/1997 | Taylor et al. |
| 5,672,418 A | 9/1997 | Hansen et al. |
| 5,672,659 A | 9/1997 | Shalaby et al. |
| 5,690,715 A | 11/1997 | Schiwek |
| 5,691,060 A | 11/1997 | Levy |
| 5,693,411 A | 12/1997 | Hansen et al. |
| 5,719,092 A | 2/1998 | Arrington |
| 5,719,228 A | 2/1998 | Taylor et al. |
| 5,733,624 A | 3/1998 | Syme et al. |
| 5,756,580 A | 5/1998 | Natori et al. |
| 5,763,524 A | 6/1998 | Arkens et al. |
| 5,788,243 A | 8/1998 | Harshaw et al. |
| 5,788,423 A | 8/1998 | Perkins |
| 5,807,364 A | 9/1998 | Hansen |
| 5,855,987 A | 1/1999 | Margel et al. |
| 5,863,985 A | 1/1999 | Shalaby et al. |
| 5,885,337 A | 3/1999 | Nohr et al. |
| 5,895,804 A | 4/1999 | Lee et al. |
| 5,905,115 A | 5/1999 | Luitjes et al. |
| 5,916,503 A | 6/1999 | Rettenbacher |
| 5,919,528 A | 7/1999 | Huijs et al. |
| 5,919,831 A | 7/1999 | Philipp |
| 5,922,403 A | 7/1999 | Tecle |
| 5,925,722 A | 7/1999 | Exner et al. |
| 5,929,184 A | 7/1999 | Holmes-Farley et al. |
| 5,929,196 A | 7/1999 | Kissel et al. |
| 5,932,344 A | 8/1999 | Ikemoto et al. |
| 5,932,665 A | 8/1999 | Deporter et al. |
| 5,932,689 A | 8/1999 | Arkens et al. |
| 5,942,123 A | 8/1999 | McArdle |
| 5,954,869 A | 9/1999 | Elfersy et al. |
| 5,977,224 A | 11/1999 | Cheung et al. |
| 5,977,232 A | 11/1999 | Arkens et al. |
| 5,981,719 A | 11/1999 | Woiszwillo et al. |
| 5,983,586 A | 11/1999 | Berdan, II et al. |
| 5,990,216 A | 11/1999 | Cai et al. |
| 5,993,709 A | 11/1999 | Bonomo et al. |
| 6,022,615 A | 2/2000 | Rettenbacher |
| 6,067,821 A | 5/2000 | Jackson et al. |
| 6,071,549 A | 6/2000 | Hansen |
| 6,071,994 A | 6/2000 | Hummerich et al. |
| 6,072,086 A | 6/2000 | James et al. |
| 6,077,883 A | 6/2000 | Taylor et al. |
| 6,090,925 A | 7/2000 | Woiszwillo et al. |
| 6,114,033 A | 9/2000 | Ikemoto et al. |
| 6,114,464 A | 9/2000 | Reck et al. |
| 6,133,347 A | 10/2000 | Vickers, Jr. et al. |
| 6,136,916 A | 10/2000 | Arkens et al. |
| 6,139,619 A | 10/2000 | Zaretskiy et al. |
| 6,143,243 A | 11/2000 | Gershun et al. |
| 6,171,444 B1 | 1/2001 | Nigam |
| 6,171,654 B1 | 1/2001 | Salsman et al. |
| 6,180,037 B1 | 1/2001 | Andersen et al. |
| 6,194,512 B1 | 2/2001 | Chen et al. |
| 6,210,472 B1 | 4/2001 | Kwan et al. |
| 6,221,958 B1 | 4/2001 | Shalaby et al. |
| 6,221,973 B1 | 4/2001 | Arkens et al. |
| 6,231,721 B1 | 5/2001 | Quick et al. |
| 6,274,661 B1 | 8/2001 | Chen et al. |
| 6,281,298 B1 | 8/2001 | Papsin, Jr. |
| 6,299,677 B1 | 10/2001 | Johnson et al. |
| 6,299,936 B1 | 10/2001 | Reck et al. |
| 6,307,732 B1 | 10/2001 | Tsubaki et al. |
| 6,310,227 B1 | 10/2001 | Sarama et al. |
| 6,313,102 B1 | 11/2001 | Colaco et al. |
| 6,319,683 B1 | 11/2001 | James et al. |
| 6,331,350 B1 | 12/2001 | Taylor et al. |
| 6,331,513 B1 | 12/2001 | Zaid et al. |
| 6,340,411 B1 | 1/2002 | Hansen et al. |
| 6,348,530 B1 | 2/2002 | Reck et al. |
| 6,365,079 B1 | 4/2002 | Winkler et al. |
| 6,372,077 B1 | 4/2002 | Tecle |
| 6,379,739 B1 | 4/2002 | Formanek et al. |
| 6,379,814 B1 | 4/2002 | Dupre et al. |
| 6,395,856 B1 | 5/2002 | Petty et al. |
| 6,403,665 B1 | 6/2002 | Sieker et al. |
| 6,407,225 B1 | 6/2002 | Mang et al. |
| 6,410,036 B1 | 6/2002 | De Rosa et al. |
| 6,440,204 B1 | 8/2002 | Rogols et al. |
| 6,441,122 B1 | 8/2002 | DeMott et al. |
| 6,461,553 B1 | 10/2002 | Hansen et al. |
| 6,468,442 B2 | 10/2002 | Bytnar |
| 6,468,730 B2 | 10/2002 | Fujiwara et al. |
| 6,469,120 B1 | 10/2002 | Elfersy et al. |
| 6,475,552 B1 | 11/2002 | Shah et al. |
| 6,482,875 B2 | 11/2002 | Lorenz et al. |
| 6,495,656 B1 | 12/2002 | Haile et al. |
| 6,521,339 B1 | 2/2003 | Hansen et al. |
| 6,525,009 B2 | 2/2003 | Sachdev et al. |
| 6,538,057 B1 | 3/2003 | Wildburg et al. |
| 6,547,867 B2 | 4/2003 | Rogols et al. |
| 6,555,616 B1 | 4/2003 | Helbing et al. |
| 6,559,302 B1 | 5/2003 | Shah et al. |
| 6,562,267 B1 | 5/2003 | Hansen et al. |
| 6,596,103 B1 | 7/2003 | Hansen et al. |
| 6,613,378 B1 | 9/2003 | Erhan et al. |
| 6,638,882 B1 | 10/2003 | Helbing et al. |
| 6,638,884 B2 | 10/2003 | Quick et al. |
| 6,699,945 B1 | 3/2004 | Chen et al. |
| 6,706,853 B1 | 3/2004 | Stanssens et al. |
| 6,719,862 B2 | 4/2004 | Quick et al. |

(56) References Cited

U.S. PATENT DOCUMENTS

| | | |
|---|---|---|
| 6,730,730 B1 | 5/2004 | Hansen et al. |
| 6,753,361 B2 | 6/2004 | Kroner et al. |
| 6,818,694 B2 | 11/2004 | Hindi et al. |
| 6,821,547 B2 | 11/2004 | Shah et al. |
| 6,852,247 B2 | 2/2005 | Bytnar |
| 6,858,074 B2 | 2/2005 | Anderson et al. |
| 6,861,495 B2 | 3/2005 | Barsotti et al. |
| 6,864,044 B2 | 3/2005 | Ishikawa et al. |
| 6,878,800 B2 | 4/2005 | Husemoen et al. |
| 6,884,849 B2 | 4/2005 | Chen et al. |
| 6,955,844 B2 | 10/2005 | Tagge et al. |
| 6,962,714 B2 | 11/2005 | Hei et al. |
| 6,989,171 B2 | 1/2006 | Portman |
| 6,992,203 B2 | 1/2006 | Trusovs |
| 7,018,490 B2 | 3/2006 | Hansen et al. |
| 7,029,717 B1 | 4/2006 | Ojima et al. |
| 7,067,579 B2 | 6/2006 | Taylor et al. |
| 7,083,831 B1 | 8/2006 | Koch et al. |
| 7,090,745 B2 | 8/2006 | Beckman et al. |
| 7,141,626 B2 | 11/2006 | Rodrigues et al. |
| 7,144,474 B1 | 12/2006 | Hansen et al. |
| 7,195,792 B2 | 3/2007 | Boston et al. |
| 7,201,778 B2 | 4/2007 | Smith et al. |
| 7,201,825 B2 | 4/2007 | Dezutter et al. |
| 7,202,326 B2 | 4/2007 | Kuroda et al. |
| 7,241,487 B2 | 7/2007 | Taylor et al. |
| 7,458,235 B2 | 12/2008 | Beaufils et al. |
| 7,514,027 B2 | 4/2009 | Horres et al. |
| 7,655,711 B2 | 2/2010 | Swift et al. |
| 7,772,347 B2 | 8/2010 | Swift et al. |
| 7,795,354 B2 | 9/2010 | Srinivasan et al. |
| 7,803,879 B2 | 9/2010 | Srinivasan et al. |
| 7,807,771 B2 | 10/2010 | Swift et al. |
| 7,842,382 B2 | 11/2010 | Helbing |
| 7,854,980 B2 | 12/2010 | Jackson et al. |
| 7,883,693 B2 | 2/2011 | Sehl et al. |
| 7,888,445 B2 | 2/2011 | Swift et al. |
| 7,947,765 B2 | 5/2011 | Swift et al. |
| 8,114,210 B2 | 2/2012 | Hampson et al. |
| 8,182,648 B2 | 5/2012 | Swift et al. |
| 8,211,923 B2 | 7/2012 | Wagner et al. |
| 8,372,900 B2 | 2/2013 | Shooshtari et al. |
| 8,377,564 B2 | 2/2013 | Shooshtari et al. |
| 8,501,838 B2 | 8/2013 | Jackson et al. |
| 8,680,224 B2 | 3/2014 | Zhang et al. |
| 8,691,934 B2 | 4/2014 | Helbing et al. |
| 8,900,495 B2 | 12/2014 | Pacorel et al. |
| 2001/0017427 A1 | 8/2001 | Rosthauser et al. |
| 2001/0046824 A1 | 11/2001 | Nigam |
| 2002/0000100 A1 | 1/2002 | Burg et al. |
| 2002/0025435 A1 | 2/2002 | Hansen et al. |
| 2002/0026025 A1 | 2/2002 | Kuo et al. |
| 2002/0028857 A1 | 3/2002 | Holy |
| 2002/0032253 A1 | 3/2002 | Lorenz et al. |
| 2002/0042473 A1 | 4/2002 | Trollsas et al. |
| 2002/0091185 A1 | 7/2002 | Taylor et al. |
| 2002/0096278 A1 | 7/2002 | Foster et al. |
| 2002/0123598 A1 | 9/2002 | Sieker et al. |
| 2002/0130439 A1 | 9/2002 | Kroner et al. |
| 2002/0161108 A1 | 10/2002 | Schultz et al. |
| 2002/0197352 A1 | 12/2002 | Portman |
| 2003/0005857 A1 | 1/2003 | Minami et al. |
| 2003/0040239 A1 | 2/2003 | Toas et al. |
| 2003/0044513 A1 | 3/2003 | Shah et al. |
| 2003/0066523 A1 | 4/2003 | Lewis et al. |
| 2003/0071879 A1 | 4/2003 | Swenson |
| 2003/0116294 A1 | 6/2003 | Kehrer et al. |
| 2003/0134945 A1 | 7/2003 | Capps |
| 2003/0148084 A1 | 8/2003 | Trocino |
| 2003/0153690 A1 | 8/2003 | Husemoen et al. |
| 2003/0185991 A1 | 10/2003 | Wigger et al. |
| 2003/0203117 A1 | 10/2003 | Bartkowiak et al. |
| 2004/0002567 A1 | 1/2004 | Chen et al. |
| 2004/0019168 A1 | 1/2004 | Soerens et al. |
| 2004/0024170 A1 | 2/2004 | Husemoen et al. |
| 2004/0033269 A1 | 2/2004 | Hei et al. |
| 2004/0033747 A1 | 2/2004 | Miller et al. |
| 2004/0034154 A1 | 2/2004 | Tutin et al. |
| 2004/0038017 A1 | 2/2004 | Tutin et al. |
| 2004/0048531 A1 | 3/2004 | Belmares et al. |
| 2004/0077055 A1 | 4/2004 | Fosdick et al. |
| 2004/0079499 A1 | 4/2004 | Dezutter et al. |
| 2004/0087024 A1 | 5/2004 | Bellocq et al. |
| 2004/0087719 A1 | 5/2004 | Rautschek et al. |
| 2004/0122166 A1 | 6/2004 | O'Brien-Bernini et al. |
| 2004/0131874 A1 | 7/2004 | Tutin et al. |
| 2004/0144706 A1 | 7/2004 | Beaufils et al. |
| 2004/0152824 A1 | 8/2004 | Dobrowolski |
| 2004/0161993 A1 | 8/2004 | Tripp et al. |
| 2004/0209851 A1 | 10/2004 | Nelson et al. |
| 2004/0213930 A1 | 10/2004 | Halabisky |
| 2004/0220368 A1 | 11/2004 | Li et al. |
| 2004/0249066 A1 | 12/2004 | Heinzman et al. |
| 2004/0254285 A1 | 12/2004 | Rodrigues et al. |
| 2004/0260082 A1 | 12/2004 | Van Der Wilden et al. |
| 2005/0001198 A1 | 1/2005 | Bytnar |
| 2005/0017394 A1* | 1/2005 | Hochsmann ......... B29C 64/165 264/113 |
| 2005/0027283 A1 | 2/2005 | Richard et al. |
| 2005/0033037 A1 | 2/2005 | Trusovs |
| 2005/0048212 A1 | 3/2005 | Clamen et al. |
| 2005/0059770 A1 | 3/2005 | Srinivasan et al. |
| 2005/0171085 A1 | 8/2005 | Pinto et al. |
| 2005/0196421 A1 | 9/2005 | Hunter et al. |
| 2005/0202224 A1 | 9/2005 | Helbing |
| 2005/0208852 A1 | 9/2005 | Weber |
| 2005/0215153 A1 | 9/2005 | Cossement et al. |
| 2005/0245669 A1 | 11/2005 | Clungeon et al. |
| 2005/0275133 A1 | 12/2005 | Cabell et al. |
| 2005/0288479 A1 | 12/2005 | Kuroda et al. |
| 2006/0005580 A1 | 1/2006 | Espiard et al. |
| 2006/0009569 A1 | 1/2006 | Charbonneau et al. |
| 2006/0044302 A1 | 3/2006 | Chen |
| 2006/0099870 A1 | 5/2006 | Garcia et al. |
| 2006/0111480 A1 | 5/2006 | Hansen et al. |
| 2006/0124538 A1 | 6/2006 | Morcrette et al. |
| 2006/0135433 A1 | 6/2006 | Murray et al. |
| 2006/0141177 A1 | 6/2006 | Ligtenberg et al. |
| 2006/0179892 A1 | 8/2006 | Horres et al. |
| 2006/0188465 A1 | 8/2006 | Perrier et al. |
| 2006/0198954 A1 | 9/2006 | Frechem et al. |
| 2006/0231487 A1 | 10/2006 | Bartley et al. |
| 2006/0252855 A1 | 11/2006 | Pisanova et al. |
| 2006/0281622 A1 | 12/2006 | Maricourt et al. |
| 2007/0006390 A1 | 1/2007 | Clamen et al. |
| 2007/0009582 A1 | 1/2007 | Madsen et al. |
| 2007/0027281 A1 | 2/2007 | Michl et al. |
| 2007/0039520 A1 | 2/2007 | Crews et al. |
| 2007/0082983 A1 | 4/2007 | Crews et al. |
| 2007/0123679 A1 | 5/2007 | Swift et al. |
| 2007/0123680 A1 | 5/2007 | Swift et al. |
| 2007/0129522 A1 | 6/2007 | Burckhardt et al. |
| 2007/0142596 A1 | 6/2007 | Swift et al. |
| 2007/0158022 A1 | 7/2007 | Heep et al. |
| 2007/0184740 A1 | 8/2007 | Keller et al. |
| 2007/0191574 A1 | 8/2007 | Miller et al. |
| 2007/0270070 A1 | 11/2007 | Othman |
| 2007/0287018 A1 | 12/2007 | Tutin et al. |
| 2007/0292618 A1 | 12/2007 | Srinivasan et al. |
| 2007/0292619 A1 | 12/2007 | Srinivasan et al. |
| 2007/0298274 A1 | 12/2007 | Eriksson et al. |
| 2008/0009209 A1 | 1/2008 | Clamen et al. |
| 2008/0009616 A1 | 1/2008 | Frank et al. |
| 2008/0051539 A1 | 2/2008 | Kelly |
| 2008/0060551 A1 | 3/2008 | Crews et al. |
| 2008/0081138 A1 | 4/2008 | Moore et al. |
| 2008/0108741 A1 | 5/2008 | Van Herwijnen et al. |
| 2008/0160260 A1 | 7/2008 | Wada et al. |
| 2008/0160302 A1 | 7/2008 | Asrar et al. |
| 2008/0194738 A1 | 8/2008 | Crews et al. |
| 2009/0169867 A1 | 7/2009 | Kelly |
| 2009/0170978 A1 | 7/2009 | Kelly |
| 2009/0227732 A1 | 9/2009 | Glockner et al. |
| 2009/0301972 A1 | 12/2009 | Hines et al. |

(56) References Cited

U.S. PATENT DOCUMENTS

| | | |
|---|---|---|
| 2009/0304919 A1 | 12/2009 | Huenig et al. |
| 2009/0306255 A1 | 12/2009 | Patel et al. |
| 2009/0324915 A1 | 12/2009 | Swift et al. |
| 2010/0029160 A1 | 2/2010 | Srinivasan et al. |
| 2010/0058661 A1 | 3/2010 | Jackson et al. |
| 2010/0080976 A1 | 4/2010 | Jackson et al. |
| 2010/0084598 A1 | 4/2010 | Jackson et al. |
| 2010/0086726 A1 | 4/2010 | Jackson et al. |
| 2010/0087571 A1 | 4/2010 | Jackson et al. |
| 2010/0098947 A1 | 4/2010 | Inoue et al. |
| 2010/0117023 A1 | 5/2010 | Dopico et al. |
| 2010/0129640 A1 | 5/2010 | Kelly |
| 2010/0130649 A1 | 5/2010 | Swift et al. |
| 2010/0175826 A1 | 7/2010 | Huenig et al. |
| 2010/0210595 A1 | 8/2010 | Wagner et al. |
| 2010/0222463 A1 | 9/2010 | Brady et al. |
| 2010/0222566 A1 | 9/2010 | Fosdick et al. |
| 2010/0282996 A1 | 11/2010 | Jaffrennou et al. |
| 2010/0301256 A1 | 12/2010 | Hampson et al. |
| 2010/0320113 A1 | 12/2010 | Swift |
| 2011/0021672 A1 | 1/2011 | Crews et al. |
| 2011/0039111 A1 | 2/2011 | Shooshtari |
| 2011/0040010 A1 | 2/2011 | Shooshtari |
| 2011/0042303 A1 | 2/2011 | Shooshtari et al. |
| 2011/0045966 A1 | 2/2011 | Shooshtari et al. |
| 2011/0089074 A1 | 4/2011 | Jackson et al. |
| 2011/0135937 A1 | 6/2011 | Swift et al. |
| 2011/0190425 A1 | 8/2011 | Swift |
| 2011/0220835 A1 | 9/2011 | Swift et al. |
| 2011/0256790 A1 | 10/2011 | Toas et al. |
| 2011/0260094 A1 | 10/2011 | Hampson et al. |
| 2011/0262648 A1 | 10/2011 | Lee et al. |
| 2011/0263757 A1 | 10/2011 | Rand et al. |
| 2011/0306726 A1 | 12/2011 | Bailey et al. |
| 2012/0037036 A1 | 2/2012 | Veit et al. |
| 2012/0133073 A1 | 5/2012 | Pacorel et al. |
| 2012/0156954 A1 | 6/2012 | Eckert et al. |
| 2013/0029150 A1 | 1/2013 | Appley et al. |
| 2013/0032749 A1 | 2/2013 | Jaffrennou et al. |
| 2013/0047888 A1 | 2/2013 | Mueller et al. |
| 2013/0059075 A1 | 3/2013 | Appley et al. |
| 2013/0082205 A1 | 4/2013 | Mueller et al. |
| 2013/0174758 A1 | 7/2013 | Mueller |
| 2013/0234362 A1 | 9/2013 | Swift et al. |
| 2013/0236650 A1 | 9/2013 | Swift et al. |
| 2013/0237113 A1 | 9/2013 | Swift et al. |
| 2013/0244524 A1 | 9/2013 | Swift et al. |
| 2014/0091247 A1 | 4/2014 | Jackson et al. |
| 2014/0134909 A1 | 5/2014 | Guo et al. |
| 2014/0357787 A1 | 12/2014 | Jobber et al. |

FOREIGN PATENT DOCUMENTS

| | | |
|---|---|---|
| CA | 1090026 | 11/1980 |
| CA | 2037214 | 9/1991 |
| CA | 2232334 | 11/1998 |
| CA | 2458333 | 12/1999 |
| CA | 2278946 | 1/2000 |
| CA | 2470783 | 12/2004 |
| CN | 1251738 | 5/2000 |
| DE | 1905054 | 8/1969 |
| DE | 4142261 | 6/1993 |
| DE | 4233622 | 4/1994 |
| DE | 4308089 | 9/1994 |
| DE | 102004033561 | 9/2005 |
| DE | 102005023431 | 11/2006 |
| EP | 0044614 A2 | 1/1982 |
| EP | 0099801 | 2/1984 |
| EP | 354023 | 2/1990 |
| EP | 0461995 | 12/1991 |
| EP | 0524518 A2 | 1/1993 |
| EP | 0547819 A2 | 6/1993 |
| EP | 0583086 A1 | 2/1994 |
| EP | 0714754 A2 | 6/1996 |
| EP | 796681 | 9/1997 |
| EP | 0826710 A2 | 3/1998 |
| EP | 856494 | 8/1998 |
| EP | 0873976 A1 | 10/1998 |
| EP | 878135 | 11/1998 |
| EP | 0882756 A2 | 12/1998 |
| EP | 0911361 A1 | 4/1999 |
| EP | 915811 | 5/1999 |
| EP | 936060 | 8/1999 |
| EP | 976866 | 2/2000 |
| EP | 0990729 A1 | 4/2000 |
| EP | 1038433 A1 | 9/2000 |
| EP | 1193288 A1 | 4/2002 |
| EP | 1084167 | 9/2002 |
| EP | 1268702 | 1/2003 |
| EP | 1382642 | 1/2004 |
| EP | 1486547 A2 | 12/2004 |
| EP | 1522642 | 4/2005 |
| EP | 1698598 A1 | 9/2006 |
| EP | 1767566 | 4/2007 |
| EP | 2223940 A1 | 9/2010 |
| EP | 2223941 | 9/2010 |
| EP | 2253663 | 11/2010 |
| FR | 2614388 | 10/1988 |
| GB | 770561 | 3/1957 |
| GB | 809675 | 3/1959 |
| GB | 926749 | 5/1963 |
| GB | 1391172 | 4/1975 |
| GB | 1469331 | 4/1977 |
| GB | 1512066 | 5/1978 |
| GB | 1525541 | 9/1978 |
| GB | 2047258 | 11/1980 |
| GB | 2078805 A | 1/1982 |
| GB | 2173523 | 10/1986 |
| GB | 2251438 | 7/1992 |
| JP | 53113784 | 10/1978 |
| JP | 57101100 | 6/1982 |
| JP | 5811193 | 1/1983 |
| JP | 61195647 | 8/1986 |
| JP | 3-173680 | 7/1991 |
| JP | 05186635 | 7/1993 |
| JP | 7-034023 | 2/1995 |
| JP | 09157627 | 6/1997 |
| JP | 10234314 | 9/1998 |
| JP | 11035491 | 2/1999 |
| JP | 11181690 | 7/1999 |
| JP | 2000327841 | 11/2000 |
| JP | 2002293576 | 9/2002 |
| JP | 2003147276 | 5/2003 |
| JP | 2003238921 | 8/2003 |
| JP | 2004060058 | 2/2004 |
| JP | 2005306919 | 11/2005 |
| NZ | 549563 | 1/2008 |
| RU | 1765996 | 8/1995 |
| SU | 374400 | 3/1973 |
| WO | 1990007541 | 7/1990 |
| WO | 1992012198 | 7/1992 |
| WO | 1995034517 | 12/1995 |
| WO | 1997049646 | 12/1997 |
| WO | 1999036368 | 7/1999 |
| WO | 199947765 | 9/1999 |
| WO | 199960042 | 11/1999 |
| WO | 199960043 | 11/1999 |
| WO | 200058085 | 10/2000 |
| WO | 2001014491 | 3/2001 |
| WO | 2001059026 | 8/2001 |
| WO | 200200429 | 1/2002 |
| WO | 200206178 | 1/2002 |
| WO | 2003029496 | 4/2003 |
| WO | 2003071879 | 9/2003 |
| WO | 2003106561 | 12/2003 |
| WO | 2004007615 | 1/2004 |
| WO | 2004076734 | 9/2004 |
| WO | 2005087837 | 9/2005 |
| WO | 2006044302 | 4/2006 |
| WO | 2006136614 | 12/2006 |
| WO | 2007014236 | 2/2007 |
| WO | 2007024020 A1 | 3/2007 |
| WO | 2007050964 | 5/2007 |
| WO | 2007112335 | 10/2007 |

(56) References Cited

FOREIGN PATENT DOCUMENTS

| WO | 2008089847 | | 7/2008 |
|---|---|---|---|
| WO | 2008089851 | | 7/2008 |
| WO | 2008141201 | | 11/2008 |
| WO | 2009019235 | | 2/2009 |
| WO | 2009129084 | | 10/2009 |
| WO | 2010027937 | | 3/2010 |
| WO | 2010139899 | | 12/2010 |
| WO | 2011019590 | | 2/2011 |
| WO | 2011019593 | | 2/2011 |
| WO | 2011019597 | | 2/2011 |
| WO | 2011019598 | | 2/2011 |
| WO | 2011022224 | | 2/2011 |
| WO | 2011022226 | | 2/2011 |
| WO | 2011022227 | | 2/2011 |
| WO | 2011091585 | A1 | 8/2011 |
| WO | 2011138458 | | 11/2011 |
| WO | 2011138458 | A1 | 11/2011 |
| WO | 2011138459 | | 11/2011 |
| WO | 2012152731 | A1 | 11/2012 |
| WO | 2013030390 | A1 | 3/2013 |
| WO | 2013150123 | | 10/2013 |
| WO | 2013159279 | A1 | 10/2013 |

OTHER PUBLICATIONS

International Search Report and Written Opinion for PCT/US2008/069046, completed Sep. 25, 2008.
International Search Report and Written Opinion for PCT/EP2011/059317, completed Jul. 15, 2011.
International Search Report for PCT/EP2008/060185, completed Oct. 23, 2008.
International Search Report for PCT/EP2011/057363, completed Sep. 5, 2011.
Ames, J.M., "The Maillard Browning Reaction—an Update," Chemistry & Industry, No. 17, 1988, 4 pages.
"Gamma-aminopropyltrimethoxysilane," Hawley's Condensed Chemical Dictionary, 14th Edition, John Wiley & Sons, Inc., 2002, 1 page.
Hodge, J.E., Chemistry of Browning Reactions in Model Systems, 1953, J. Agric. Food Chem., vol. 1, No. 15, pp. 928-943.
Agyei-Aye et al., "The Role of Anion in the Reaction of Reducing Sugars with Ammonium Salts," Carbohydrate Research 2002, 337: 2273-2277.
Laroque et al., "Kinetic study on the Maillard reaction. Consideration of sugar reactivity," Food Chemistry 2008, 111: 1032-1042.
Bjorksten et al., "Polyester Resin—Glass Fiber Laminates," Industrial and Engineering Chemistry (1954).
Dow Corning, "A Guide to Silane Solutions," 2005.
Knauf Data Sheet, 2006.
Molasses Corporation, United States Sugar Corporation, http://www.suga-lik.com/molasses/composition.html (Sep. 29, 2003).
Clamen, Guy, "Acrylic Thermosets: A Safe Alternative to Formaldehyde Resins," Nonwovens World, Apr.-May 2004, pp. 96-102.
Opposition to AU 2006272595, Amended Statement of Grounds and Particulars, issued from Australian Patent Office, Jul. 6, 2012, 22 pages.
Decision re Opposition to AU 2006272595, issued from Australian Patent Office, Aug. 14, 2015, 25 pages.
Opposition to EP 1732968, Notice of Opposition: Prior Art, Scope of the Patent, Reasons for the Opposition, issued from European Patent Office, Mar. 8, 2012, 18 pages.
Decision re Opposition to EP 1732968, issued from the European Patent Office, Nov. 14, 2014, 5 pages.
Opposition to EA 019802, submitted to Eurasian Patent Office on Dec. 26, 2014, 36 pages.
Decision re Opposition to EA 019802, issued by Eurasian Patent Office on Aug. 18, 2015, 15 pages.
Owens Corning Retiree Update: What Goes Around, Comes Around: A tale of Natural Binders, revised Mar. 20, 2013 p. 4.
A.P. Bryant, "The Terminology of Sugars," Industrial and Engineering Chemistry, vol. 26, No. 2, p. 231, Feb. 1934.
Food Flavor Chemistry, p. 162, Mar. 21, 2009 (English Abstract).
Viswanathan, T., "Chapter 28: Thermosetting Adhesive Resins from Whey and Whey Byproducts," in Adhesives from Renewable Resources, ACS Symposium Series, Hemingway, R.W., et al. (Eds.), American Chemical Society, Washington, DC (1989).
Viswanathan, T., and Richardson, T., "Thermosetting Adhesive Resins from Whey and Whey Byproducts," Ind. Eng. Chem. Prod. Res. Dev. 23:644-47, American Chemical Society, United States (1984).
Residential Energy Conservation: vol. 1, Congress of the U.S., Office of Technology Assessment (Ed.), 357 pages (Jan. 1, 1979).
Office action for co-pending U.S. Appl. No. 12/524,502 (9 pages)—dated Sep. 21, 2012.
Office action for co-pending U.S. Appl. No. 12/524,502 (9 pages)—dated Apr. 4, 2013.
Office action for co-pending U.S. Appl. No. 12/524,512 (7 pages)—dated Aug. 6, 2012.
Office action for co-pending U.S. Appl. No. 12/524,512 (9 pages)—dated Apr. 1, 2013.
Office action for co-pending U.S. Appl. No. 12/524,512 (14 pages)—dated Nov. 12, 2014.
Office action for co-pending U.S. Appl. No. 12/524,512 (9 pages)—dated Jul. 10, 2015.
Office action for co-pending U.S. Appl. No. 12/524,512 (10 pages)—dated Mar. 23, 2016.
Office action for co-pending U.S. Appl. No. 12/524,512 (13 pages)—dated Oct. 5, 2016.
Office action for co-pending U.S. Appl. No. 12/524,512 (13 pages)—dated Apr. 6, 2018.
Office action for co-pending US Appl. No. 12/524,512 (15 pages)—dated Jan. 17, 2019.
Office action for co-pending U.S. Appl. No. 12/524,469 (7 pages)—dated Jun. 7, 2012.
Office action for co-pending U.S. Appl. No. 12/524,469 (8 pages)—dated Jan. 29, 2013.
Office action for co-pending U.S. Appl. No. 12/524,469 (7 pages)—dated Aug. 20, 2013.
Office action for co-pending U.S. Appl. No. 12/524,469 (9 pages)—dated Jun. 9, 2014.
Office action for co-pending U.S. Appl. No. 12/524,469 (9 pages)—dated Oct. 17, 2014.
Office action for co-pending U.S. Appl. No. 12/524,469 (9 pages)—dated Jul. 23, 2015.
Office action for co-pending U.S. Appl. No. 12/524,539 (13 pages)—dated Jun. 21, 2012.
Office action for co-pending U.S. Appl. No. 12/524,539 (13 pages)—dated Jun. 6, 2013.
Office action for co-pending U.S. Appl. No. 12/524,539 (12 pages)—dated Dec. 17, 2014.
Office action for co-pending U.S. Appl. No. 12/524,539 (7 pages)—dated Jul. 15, 2015.
Office action for co-pending U.S. Appl. No. 12/524,539 (7 pages)—dated Mar. 23, 2016.
Office action for co-pending U.S. Appl. No. 12/524,539 (7 pages)—dated Dec. 29, 2016.
Office action for co-pending U.S. Appl. No. 12/524,522 (4 pages)—dated Oct. 11, 2011.
Office action for co-pending U.S. Appl. No. 12/667,718 (5 pages)—dated Sep. 3, 2013.
Office action for co-pending U.S. Appl. No. 12/667,718 (6 pages)—dated Sep. 9, 2014.
Office action for co-pending U.S. Appl. No. 12/671,922 (10 pages)—dated Oct. 7, 2011.
Office action for co-pending U.S. Appl. No. 12/671,922 (10 pages)—dated May 10, 2012.
Office action for co-pending U.S. Appl. No. 12/671,922 (9 pages)—dated Sep. 23, 2014.
Office action for co-pending U.S. Appl. No. 12/671,922 (5 pages)—dated Apr. 4, 2016.
Office action for co-pending U.S. Appl. No. 13/388,408 (5 pages)—dated Aug. 15, 2013.
Office action for co-pending U.S. Appl. No. 13/371,829 (9 pages)—dated Dec. 20, 2012.

(56) References Cited

OTHER PUBLICATIONS

Office action for co-pending U.S. Appl. No. 13/371,829 (6 pages)—dated Jul. 12, 2013.
Office action for co-pending U.S. Appl. No. 13/371,829 (6 pages)—dated Aug. 12, 2014.
Office action for co-pending U.S. Appl. No. 13/637,794 (8 pages)—dated Aug. 12, 2013.
Office action for co-pending U.S. Appl. No. 13/637,794 (9 pages)—dated Mar. 26, 2014.
Office action for co-pending U.S. Appl. No. 13/696,439 (11 pages)—dated Jan. 8, 2014.
Office action for co-pending U.S. Appl. No. 13/696,452 (7 pages)—dated Jan. 13, 2015.
Office action for co-pending U.S. Appl. No. 13/696,452 (9 pages)—dated Oct. 27, 2015.
Office action for co-pending U.S. Appl. No. 13/702,144 (6 pages)—dated Jan. 10, 2014.
Office action for co-pending U.S. Appl. No. 13/702,144 (7 pages)—dated Jul. 29, 2014.
Office action for co-pending U.S. Appl. No. 13/823,818 (9 pages)—dated Mar. 26, 2015.
Office action for co-pending U.S. Appl. No. 13/866,368 (16 pages)—dated Aug. 29, 2013.
Office action for co-pending U.S. Appl. No. 13/866,368 (11 pages)—dated Apr. 16, 2014.
Office action for co-pending U.S. Appl. No. 13/866,368 (8 pages)—dated Aug. 21, 2014.
Office action for co-pending U.S. Appl. No. 13/866,419 (14 pages)—dated Sep. 20, 2013.
Office action for co-pending U.S. Appl. No. 13/866,419 (10 pages)—dated Apr. 25, 2014.
Office action for co-pending U.S. Appl. No. 13/866,419 (8 pages)—dated Oct. 9, 2014.
Office action for co-pending U.S. Appl. No. 13/866,419 (8 pages)—dated Sep. 25, 2015.
Office action for co-pending U.S. Appl. No. 13/868,233 (23 pages)—dated Aug. 13, 2013.
Office action for co-pending U.S. Appl. No. 13/868,233 (12 pages)—dated Apr. 15, 2014.
Office action for co-pending U.S. Appl. No. 13/868,233 (8 pages)—dated Oct. 7, 2014.
Office action for co-pending U.S. Appl. No. 13/868,233 (8 pages)—dated Jul. 16, 2015.
Office action for co-pending U.S. Appl. No. 13/868,238 (8 pages)—dated Jul. 16, 2014.
Office action for co-pending U.S. Appl. No. 12/976,379 (7 pages)—dated Jan. 10, 2012.
Office action for co-pending U.S. Appl. No. 12/976,379 (6 pages)—dated Jul. 27, 2012.
Office action for co-pending U.S. Appl. No. 12/976,379 (9 pages)—dated Mar. 7, 2013.
Office action for co-pending U.S. Appl. No. 12/976,379 (8 pages)—dated Aug. 20, 2013.
Office action for co-pending U.S. Appl. No. 12/599,858 (8 pages)—dated May 11, 2011.
Office action for co-pending U.S. Appl. No. 13/341,542 (8 pages)—dated Dec. 26, 2012.
Office action for co-pending U.S. Appl. No. 13/341,542 (7 pages)—dated Feb. 10, 2014.
Office action for co-pending U.S. Appl. No. 14/026,394 (6 pages)—dated Aug. 14, 2014.
Office action for co-pending U.S. Appl. No. 14/272,556 (14 pages)—dated Nov. 20,2014.
Office action for co-pending U.S. Appl. No. 14/272,556 (12 pages)—dated Sep. 17, 2015.
Office action for co-pending U.S. Appl. No. 14/342,069 (17 pages)—dated Dec. 29, 2015.
Office action for co-pending U.S. Appl. No. 14/342,069 (22 pages)—dated Sep. 2, 2016.
Office action for co-pending U.S. Appl. No. 14/342,069 (21 pages)—dated Sep. 26, 2017.
Office action for co-pending U.S. Appl. No. 14/342,069 (21 pages)—dated Jun. 6, 2018.
Office action for co-pending U.S. Appl. No. 14/649,277 (9 pages)—dated Jul. 22, 2016.
Office action for co-pending U.S. Appl. No. 14/686,915 (8 pages)—dated Nov. 18, 2016.
Office action for co-pending U.S. Appl. No. 14/810,765 (7 pages)—dated Jan. 29, 2016.
Office action for co-pending U.S. Appl. No. 14/828,916 (8 pages)—dated Nov. 25, 2016.
Office action for co-pending U.S. Appl. No. 14/867,502 (9 pages)—dated Nov. 18, 2016.
Office action for co-pending U.S. Appl. No. 15/172,432 (16 pages)—dated Apr. 17, 2017.
Office action for co-pending U.S. Appl. No. 15/702,087 (5 pages)—dated Nov. 9, 2018.
Office action for co-pending U.S. Appl. No. 15/177,442 (17 pages)—dated May 19, 2017.
Office action for co-pending U.S. Appl. No. 15/378,159 (18 pages)—dated Mar. 2, 2017.
Office action for co-pending U.S. Appl. No. 15/222,122 (8 pages)—dated Nov. 20, 2017.
Office action for co-pending U.S. Appl. No. 15/310,837 (13 pages)—dated Jun. 21, 2018.
Office action for co-pending U.S. Appl. No. 15/411,972 (9 pages)—dated Mar. 28, 2017.
Office action for co-pending U.S. Appl. No. 15/411,972 (8 pages)—dated Nov. 29, 2017.
Office action for co-pending U.S. Appl. No. 15/411,972 (9 pages)—dated Jun. 14, 2018.
Office action for co-pending U.S. Appl. No. 15/116,254 (8 pages)—dated Apr. 26, 2018.
Office action for co-pending U.S. Appl. No. 15/116,254 (10 pages)—dated Aug. 15, 2018.
Office action for co-pending U.S. Appl. No. 15/333,670 (5 pages)—dated Dec. 8, 2017.
Office Action for co-pending U.S. Appl. No. 14/116,048 (10 pages)—dated Jun. 23, 2017.
Office action for co-pending U.S. Appl. No. 15/959,131 (8 pages)—dated Nov. 8, 2019.
Office action for co-pending U.S. Appl. No. 15/822,102 (6 pages)—dated Dec. 6, 2019.
Office action for co-pending U.S. Appl. No. 15/690,623 (6 pages)—dated Jan. 9, 2020.
Other Information—Narrative of verbal disclosure of Brian Swift (1 page)—May 13, 2014.
Petition for Inter Partes Review of U.S. Pat. No. 8,114,210 (52 pages, filed Jun. 12, 2015 by Petitioners Johns Manville Corporation and Johns Manville, Inc.).
Declaration of Dr. Frederick J. Hirsekorn Regarding U.S. Pat. No. 8,114,210 (58 pages, filed Jun. 12, 2015 by Petitioners Johns Manville Corporation and Johns Manville, Inc. in connection with Petition for Inter Partes Review of U.S. Pat. No. 8,114,210).
1st Petition for Inter Partes Review of U.S. Pat. No. D. 631,670 (68 pages, filed Jun. 19, 2015 by Petitioners Johns Manville Corporation and Johns Manville, Inc.).
2nd Petition for Inter Partes Review of U.S. Pat. No. D. 631,670 (62 pages, filed Nov. 2, 2015 by Petitioners Johns Manville Corporation and Johns Manville, Inc.).
Decision of PTAB regarding Institution of Inter Partes Review for U.S. Pat. No. D. 631,670 (33 pages)—Jan. 12, 2016.
Decision2 of PTAB regarding Institution of Inter Partes Review for U.S. Pat. No. D. 631,670 (27 pages)—May 9, 2016.
Final Written Decision of PTAB regarding Inter Partes Review of U.S. Pat. No. D. 631,670 based on 1st Petition (56 pages)—Jan. 11, 2017.
Final Written Decision of PTAB regarding Inter Partes Review of U.S. Pat. No. D. 631,670 based on 2nd Petition (55 pages)—May 8, 2017.

(56) References Cited

OTHER PUBLICATIONS

Court of Appeals for Federal Circuit Judgment from Appeal of PTAB Decisions in Inter Partes Reviews of U.S. Pat. No. D. 631,670 (2 pages)—Jul. 13, 2018.
1st Petition for Inter Partes Review of U.S. Pat. No. 8,940,089 (61 pages, filed Jul. 1, 2015 by Petitioners Johns Manville Corporation and Johns Manville, Inc.).
Declaration of Dr. Frederick J. Hirsekorn Regarding U.S. Pat. No. 8,940,089 (70 pages, filed Jul. 1, 2015 by Petitioners Johns Manville Corporation and Johns Manville, Inc. In connection with 1st Petition for Inter Partes Review of U.S. Pat. No. 8,940,089).
2nd Petition for Inter Partes Review of U.S. Pat. No. 8,940,089 (56 pages, filed Jul. 10, 2015 by Petitioners Johns Manville Corporation and Johns Manville, Inc.).
Declaration of Dr. Frederick J. Hirsekorn Regarding U.S. Pat. No. 8,940,089 (67 pages, filed Jul. 10, 2015 by Petitioners Johns Manville Corporation and Johns Manville, Inc. in connection with 2nd Petition for Inter Partes Review of U.S. Pat. No. 8,940,089).
3rd Petition for Inter Partes Review of U.S. Pat. No. 8,940,089 (62 pages, filed Jul. 17, 2015 by Petitioners Johns Manville Corporation and Johns Manville, Inc.).
Declaration of Dr. Frederick J. Hirsekorn Regarding U.S. Pat. No. 8,940,089 (76 pages, filed Jul. 17, 2015 by Petitioners Johns Manville Corporation and Johns Manville, Inc. in connection with 3rd Petition for Inter Partes Review of U.S. Pat. No. 8,940,089).
Declaration of Dr. Elam Leed (11 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
Declaration of Dr. Jonathan Vickers (10 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
1st Petition for Inter Partes Review of U.S. Pat. No. 9,039,827 (60 pages, filed Jul. 29, 2015 by Petitioners Johns Manville Corporation and Johns Manville, Inc.).
Declaration of Dr. Frederick J. Hirsekorn Regarding U.S. Pat. No. 9,039,827 (72 pages, filed Jul. 29, 2015 by Petitioners Johns Manville Corporation and Johns Manville, Inc. in connection with $1^{st}$ Petition for Inter Partes Review of U.S. Pat. No. 9,039,827).
2nd Petition for Inter Partes Review of U.S. Pat. No. 9,039,827 (51 pages, filed Aug. 5, 2015 by Petitioners Johns Manville Corporation and Johns Manville, Inc.).
Declaration of Dr. Frederick J. Hirsekorn Regarding U.S. Pat. No. 9,039,827 (65 pages, filed Aug. 5, 2015 by Petitioners Johns Manville Corporation and Johns Manville, Inc. in connection with $2^{nd}$ Petition for Inter Partes Review of U.S. Pat. No. 9,039,827).
3rd Petition for Inter Partes Review of U.S. Pat. No. 9,039,827 (57 pages, filed Aug. 7, 2015 by Petitioners Johns Manville Corporation and Johns Manville, Inc.).
Declaration of Dr. Frederick J. Hirsekorn Regarding U.S. Pat. No. 9,039,827 (75 pages, filed Aug. 7, 2015 by Petitioners Johns Manville Corporation and Johns Manville, Inc. in connection with $3^{rd}$ Petition for Inter Partes Review of U.S. Pat. No. 9,039,827).
Declaration of Dr. Elam Leed (11 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Declaration of Dr. Jonathan Vickers (10 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Petition for Inter Partes Review of U.S. Pat. No. 9,469,747 (67 pages, filed Mar. 20, 2018 by Petitioners Johns Manville Corporation and Johns Manville, Inc.).
Petition for Inter Partes Review of U.S. Pat. No. 9,828,287 (86 pages, filed Mar. 23, 2018 by Petitioners Johns Manville Corporation and Johns Manville, Inc.).
Petition for Inter Partes Review of U.S. Pat. No. 9,464,207 (78 pages, filed Mar. 28, 2018 by Petitioners Johns Manville Corporation and Johns Manville, Inc.).
Petition for Inter Partes Review of U.S. Pat. No. 9,926,464 (74 pages, filed Mar. 30, 2018 by Petitioners Johns Manville Corporation and Johns Manville, Inc.).
Office Action Granting Ex Parte Reexamination of U.S. Pat. No. 7,888,445, dated Dec. 24, 2013, in Control No. 90/013,029, 11 pages.
Office Action Granting Ex Parte Reexamination of U.S. Pat. No. 7,772,347, dated Dec. 24, 2013, in Control No. 90/013,030, 14 pages.
Office Action Granting Ex Parte Reexamination of U.S. Pat. No. 7,854,980, dated Apr. 15, 2014, in Control No. 90/013,156, 20 pages.
Declaration of Jan Rud Andersen submitted in Ex parte Reexamination Control No. 90/013,030, as Document OTH-C, Oct. 10, 2013, 4 pages.
Final Rejection in Ex Parte Reexamination of U.S. Pat. No. 7,888,445 (20 pages)—Jul. 24, 2015.
Final Rejection in Ex Parte Reexamination of U.S. Pat. No. 7,772,347 (23 pages)—Jul. 24, 2015.
Final Rejection in Ex Parte Reexamination of U.S. Pat. No. 7,854,980 (31 pages)—Aug. 18, 2015.
Advisory Action in Ex Parte Reexamination of U.S. Pat. No. 7,888,445 (4 pages)—Oct. 6, 2015.
Advisory Action in Ex Parte Reexamination of U.S. Pat. No. 7,772,347 (4 pages)—Oct. 6, 2015.
Advisory Action in Ex Parte Reexamination of U.S. Pat. No. 7,854,980 (4 pages)—Nov. 18, 2015.
Examiner's Answer in Ex Parte Reexamination of U.S. Pat. No. 7,888,445 (8 pages)—Mar. 23, 2016.
Examiner's Answer in Ex Parte Reexamination of U.S. Pat. No. 7,772,347 (8 pages)—Mar. 23, 2016.
Examiner's Answer in Ex Parte Reexamination of U.S. Pat. No. 7,854,980 (8 pages)—Mar. 22, 2016.
Decision of PTAB in Ex Parte Reexamination of U.S. Pat. No. 7,888,445 (17 pages)—Sep. 29, 2016.
Decision of PTAB in Ex Parte Reexamination of U.S. Pat. No. 7,772,347 (18 pages)—Sep. 29, 2016.
Decision of PTAB in Ex Parte Reexamination of U.S. Pat. No. 7,854,980 (22 pages)—Sep. 30, 2016.
Court of Appeals for Federal Circuit Judgment from Consolidated Appeal of PTAB Decisions in Ex Parte Reexamination of U.S. Pat. Nos. 7,888,445, 7,772,347 and 7,854,980 (5 pages)—Mar. 9, 2018.
Notice of Intent to Issue Ex Parte Reexamination Certificate for U.S. Pat. No. 7,772,347 (4 pages)—Oct. 24, 2018.
Notice of Intent to Issue Ex Parte Reexamination Certificate for U.S. Pat. No. 7,888,445 (4 pages)—Dec. 7, 2018.
Notice of Intent to Issue Inter Partes Reexamination Certificate for U.S. Pat. No. 7,888,445 (14 pages)—Sep. 24, 2020.
Notice of Intent to Issue Inter Partes Reexamination Certificate for U.S. Pat. No. 7,772,347 (13 pages)—Sep. 25, 2020.
Decision of USPTO to Reopen Prosecution in Ex Parte Reexamination of U.S. Pat. No. 7,854,980 (7 pages)—Jan. 7, 2019.
Non-final Office Action from Reopened Prosecution in Ex Parte Reexamination of U.S. Pat. No. 7,854,980 (26 pages)—dated Apr. 3, 2019.
Final Office Action from Reopened Prosecution in Ex Parte Reexamination of U.S. Pat. No. 7,854,980 (11 pages)—dated Aug. 8, 2019.
Notice of Intent to Issue Ex Parte Reexamination Certificate for U.S. Pat. No. 7,854,980 (3 pages)—Oct. 29, 2019.
Notice of Intent to Issue Inter Partes Reexamination Certificate for U.S. Pat. No. 7,807,771 (4 pages)—Jan. 30, 2014.
Notice of Intent to Issue Inter Partes Reexamination Certificate for U.S. Pat. No. 7,854,980 (6 pages)—Aug. 31, 2017.
Decision of PTAB in Inter Partes Reexamination of U.S. Pat. No. 7,888,445 (34 pages)—May 1, 2015.
Decision of PTAB in Inter Partes Reexamination of U.S. Pat. No. 7,772,347 (36 pages)—May 1, 2015.
Decision of PTAB in Inter Partes Reexamination of U.S. Pat. No. 7,854,980 (25 pages)—Jul. 30, 2015.

(56) References Cited

OTHER PUBLICATIONS

Remand Order of PTAB in Inter Partes Reexamination of U.S. Pat. No. 7,888,445 (5 pages)—Dec. 9, 2015.
Remand Order of PTAB in Inter Partes Reexamination of U.S. Pat. No. 7,772,347 (5 pages)—Dec. 9 , 2015.
Examiner's Determination on Patent Owner Response/Requester Comments after Board Decision in Inter Partes Reexamination of U.S. Pat. No. 7,888,445 (22 pages)—Oct. 17, 2016.
Examiner's Determination on Patent Owner Response/Requester Comments after Board Decision in Inter Partes Reexamination of U.S. Pat. No. 7,772,347 (17 pages)—Oct. 17, 2016.
Court of Appeals for Federal Circuit Opinion/Judgment from Appeal of PTAB Decision in Inter Partes Reexamination of U.S. Pat. No. 7,854,980 (13 pages)—Feb. 27, 2017.
Final Decision of PTAB in Inter Partes Reexamination of U.S. Pat. No. 7,888,445 (25 pages)—Sep. 8, 2017.
Final Decision of PTAB in Inter Partes Reexamination of U.S. Pat. No. 7,772,347 (24 pages)—Sep. 8, 2017.
Decision of PTAB re Request for Rehearing in Inter Partes Reexamination of U.S. Pat. No. 7,888,445 (7 pages)—Feb. 12, 2018.
Decision of PTAB re Request for Rehearing in Inter Partes Reexamination of U.S. Pat. No. 7,772,347 (7 pages)—Feb. 12, 2018.
Court of Appeals for Federal Circuit Decision re Consolidated Appeal of PTAB Decision in Inter Partes Reexamination of U.S. Pat. No. 7,772,347 and U.S. Pat. No. 7,888,445 (14 pages)—Oct. 15, 2019.
Remand Order of PTAB in Inter Partes Reexamination of U.S. Pat. No. 7,888,445 (3 pages)—Jul. 1, 2020.
Remand Order of PTAB in Inter Partes Reexamination of U.S. Pat. No. 7,772,347 (3 pages)—Jul. 1, 2020.
Decision of PTAB regarding Institution of Inter Partes Review for U.S. Pat. No. 8,114,210 (20 pages)—Oct. 21, 2015.
Final Written Decision of PTAB regarding Inter Partes Review of U.S. Pat. No. 8,114,210 (39 pages)—Oct. 19, 2016.
Court of Appeals for Federal Circuit Judgment from Appeal of PTAB Decision in Inter Partes Review of U.S. Pat. No. 8,114,210 (5 pages)—Jan. 16, 2018.
Decision of USPTO Granting Ex Parte Re-exam of U.S. Pat. No. 8,114,210 (11 pages)—Apr. 9, 2020.
Decision1 of PTAB declining Institution of Inter Partes Review for U.S. Pat. No. 8,940,089 (16 pages)—Dec. 17, 2015.
Decision2 of PTAB declining Institution of Inter Partes Review for U.S. Pat. No. 8,940,089 (19 paages)—Dec. 17, 2015.
Decision3 of PTAB declining Institution of Inter Partes Review for U.S. Pat. No. 8,940,089 (14 pages)—Dec. 17, 2015.
Decision1 of PTAB declining Institution of Inter Partes Review for U.S. Pat. No. 9,039,827 (16 pages)—Jan. 4, 2016.
Decision2 of PTAB declining Institution of Inter Partes Review for U.S. Pat. No. 9,039,827 (19 pages)—Jan. 4, 2016.
Decision3 of PTAB declining Institution of Inter Partes Review for U.S. Pat. No. 9,039,827 (14 pages)—Jan. 4, 2016.
Decision of PTAB denying Institution of Inter Partes Review for U.S. Pat. No. 9,926,464 (29 pages)—Oct. 2, 2018.
Decision of PTAB denying Institution of Inter Partes Review for U.S. Pat. No. 9,464,207 (28 pages)—Oct. 2, 2018.
Decision of PTAB denying Institution of Inter Partes Review for U.S. Pat. No. 9,469,747 (29 pages)—Oct. 3, 2018.
Decision of PTAB denying Institution of Inter Partes Review for U.S. Pat. No. 9,828,287 (22 pages)—Oct. 16, 2018.
Decision of USPTO Granting Ex Parte Re-exam of U.S. Pat. No. 9,828,287 (13 pages)—Jul. 17, 2020.
Decision of USPTO Granting Ex Parte Re-exam of U.S. Pat. No. 9,464,207 (14 pages)—Jul. 31, 2020.
Decision of USPTO Granting Ex Parte Re-exam of U.S. Pat. No. 9,926,464 (18 pages)—Aug. 5, 2020.
Decision of USPTO Granting Ex Parte Re-exam of U.S. Pat. No. 8,940,089 (17 pages)—Oct. 16, 2020.
Decision of USPTO Granting Ex Parte Re-exam of U.S. Pat. No. 9,039,827 (16 pages)—Oct. 16, 2020.
Decision of USPTO Granting Ex Parte Re-exam of U.S. Pat. No. 9,469,747 (16 pages)—Nov. 9, 2020.
Statement of Revocation Grounds re GB2496951—Claimant Rockwool International (May 21, 2018, 22 pages).
Statement of Revocation Grounds re GB2451719—Claimant Rockwool International (May 18, 2018, 22 pages).
Expert Report re Revocation of GB2451719 and GB2496951—Claimant Rockwool International (Nov. 12, 2018, 11 pages).
United Kingdom Intellectual Property Office, Decision in Rockwool International v. Knauf Insulation Limited, Application under Section 72 for revocation of patents GB2451719 and GB2496951 (May 28, 2019—18 pages).
Decision of EPO Board of Appeal re Added Matter vis-à-vis EP06788492.4 (Jul. 17, 2019—14 pages).
U.S. Pat. No. 2,965,504—Part 1 (10 pages).
U.S. Pat. No. 2,965,504—Part 2 (14 pages).
U.S. Pat. No. 2,965,504—Part 3 (14 pages).
Gogek Attorney Comments re U.S. Pat. No. 2,965,504—Apr. 6, 1960 (3 pages).
Gogek Affidavit Under Rule 132 re U.S. Pat. No. 2,965,504—Feb. 26, 1960 (3 pages).

* cited by examiner

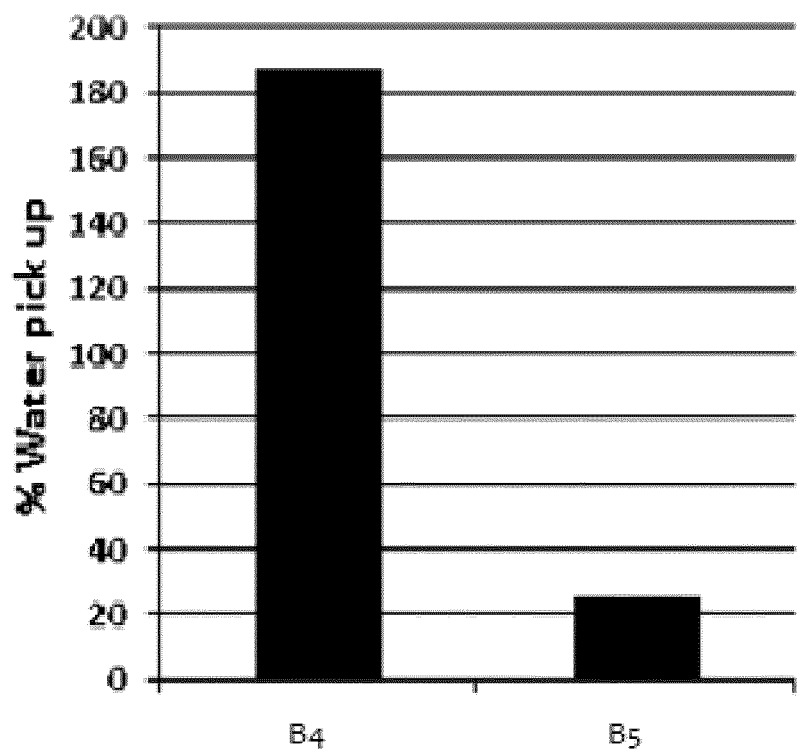
Fig. 3
Fig. 4
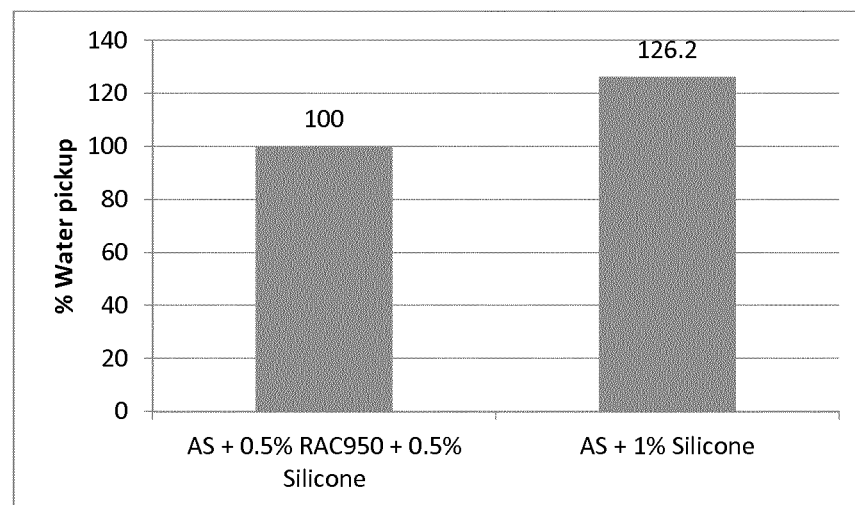

BINDERS

CROSS-REFERENCE TO RELATED APPLICATIONS

This application is a U.S. national counterpart application of International Application Serial No. PCT/EP2017/063147, filed May 31, 2017, under 35 U.S.C. § 371, which claims priority to GB Application Serial No. 1610063.8, filed Jun. 9, 2016, the disclosures of which are hereby incorporated herein by reference.

The present invention relates to composite products manufactured using a binder composition which comprises a carbohydrate component, possibly a crosslinker, possibly reaction product of carbohydrate component and crosslinker; it also relates to such binders obtained from said binder composition.

While known carbohydrate based binders and composite material made therewith show interesting mechanical properties, there always is a need to further improve said properties, more specifically under humid or wet conditions.

In accordance with one of its aspects, the present invention provides a binder composition as defined in claim 1. Further aspects are defined in other independent claims. The dependent claims define preferred or alternative embodiments.

The term "binder composition" as used herein means all ingredients applied to the matter to be bound and/or present on the matter to be bound, notably prior to curing, (other than the matter and any moisture contained within the matter) including reactants, solvents (including water), any carbohydrate component, any crosslinker and any additives.

The term "binder" is used herein to designate a thermoset binder resin obtained from the "binder composition".

The term "cured" means that the components of the binder composition have been subjected to conditions that lead to chemical change, such as covalent bonding, hydrogen bonding and chemical crosslinking, which may increase the cured product's durability and solvent resistance, and result in thermoset material.

The term "dry weight of the binder composition" as used herein means the weight of all components of the binder composition other than any water that is present (whether in the form of liquid water or in the form of water of crystallization).

The term "carbohydrate component" as used herein means a carbohydrate or derivative thereof, including monosaccharides, disaccharides, oligosaccharides and polysaccharides. Examples are glucose, fructose, xylose, sucrose, maltose, trehalose, sorbitol, dextrines, maltodextrins, amylose, amylopectine, starch, modified starches, cellulose, hemicellulose, and pectins, hydrolysis products thereof, precursors thereof that form the relevant carbohydrates or derivatives thereof in situ, and mixtures thereof. The carbohydrate component may be a reducing sugar reactant or a non-reducing sugar that generates a reducing sugar in situ.

The term "crosslinker" as used herein comprises compounds that are capable of reacting with the carbohydrate component to form ramifications or reticulations of the said carbohydrate component.

Phenalkamines are known as curing agents and may be obtained by the reaction of an alkylphenol with aliphatic polyamines and formaldehyde. The polyamine advantageously is an amine having two or more primary amine functionalities, possibly substituted with additional secondary amine functionalities.

A preferred phenalkamine shows the general formula below

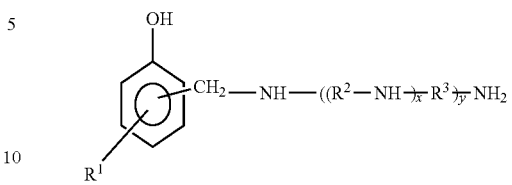

wherein
$R_1$ is a straight or branched, saturated or unsaturated alkyl group comprising 12 to 24 C-atoms
$R^2$ and $R^3$ are linear or branched alkanediyl having 2 to 20 C-atoms, cycloaliphatic groups or contain aromatic groups and
x is an integer ranging from 0 to 5 and y is an integer ranging from 1 to 5.

Suitable polyamines for reaction with alkylphenol and formaldehyde show the general formula

wherein $R_2$ and $R_3$ are linear or branched alkanediyl having 2 to 20 C-atoms, cycloaliphatic groups or contain aromatic groups, and x is an integer ranging from 0 to 5 and y is an integer ranging from 1 to 5.

Examples of polyamines include, but are not limited to: ethyleneamines such as 1,2-ethanediamine (EDA), N-(2-aminoethyl)-1,2-ethanediamine (DETA), N,N-bis(2-aminoethyl)-I,2-ethanediamine (TETA), N-(2-aminoethyl)-N'-[(2-amino-ethyl)amino-ethyl]-I,2-ethanediamine (TEPA), aminoethylpiperazine, and higher polyethylenepolyamines, 1,3-benzenedimethanamine (MXDA—metaxylylene diamine); 1,3-cyclohexanedimethanamine (1,3-BAC); 1,2-diaminocyclohexane (DACH); norbornanediamine; isophorone diamine; 5-amino-I,3,3-trimethylcyclohexanemethanamine (IPDA); trimethylhexamethylenediamine (TMD); 1,3-pentanediamine; 2-methyl-I,5-pentanediamine; 1,6-hexanediamine (HMDA) and 4,4'-diaminodicyclohexylmethane (PACM).

The binder composition may be used in the manufacturing of composite products, such as wood boards, for example wood particle boards, medium density fibreboard (MDF), chip boards or orientated strand board (OSB), and plywood. The binder may be used to bond abrasive particles together and/or onto a backing sheet or to bond fibers, such as woven and non-woven natural, synthetic, textile or mineral fibers, for instance glass fibers or mineral wool fibers. Such bonded mineral fibers, for instance mineral glass wool or stone wool fibers, may be used in the manufacturing of thermal and/or acoustic insulating materials.

A wood particle board is a composite material manufactured from wood particles, for example wood chips, sawmill shavings and/or saw dust at varying particle sizes held together by a binder and used especially for the manufacture of furniture, such as cabinets, kitchens and bathroom furniture. Generally, wood particle board (which is sometimes referred to as "chipboard") is produced by mixing wood particles and a binder composition, e.g. a thermo-curable resin, subsequently forming the resulting mixture into a sheet or mat and compressing said sheet or mat under elevated temperatures.

Plywood is a composite sheet material manufactured from thin layers of wood glued together by a binder, adjacent wood layers having their wood grain rotated by approx. 90 degrees to one another.

When used as a binder in wood boards, such as plywood, particle boards, fiber boards, the solid content of the aqueous binder composition may range from 50 to 95 w %, preferably 50 to 90 w %, more preferably 55 to 85 w % or even 60 to 80 w %, based upon the weight of the total aqueous binder composition.

The binder may also be used to bond synthetic or natural fibers, for instance mineral fibers, such as glass fibers, glass wool or stone wool. In view of the manufacture of a fiber mat, such as for insulating products, for instance, an aqueous binder composition is applied onto the fibers, e.g. by spraying, and the binder impregnated mineral fibers are deposited as a mat and subsequently subjected to heat for curing of the binder composition, hence forming an assembly of bonded fibers.

When used in the manufacture of a fiber based composite, the solid content of the invention aqueous binder composition may range from 5 to 95 w %, advantageously from 8 to 90 w %, preferably from 10 to 85 w %, based on the weight of the total aqueous binder composition. More specifically, when used as a binder for mineral wool insulation, the solid content of the aqueous binder composition may be in the range from 5 to 25 w %, preferably from 8 to 20 w %, more preferably from 10 to 20 w % or even 12 to 18 w %, based on the weight of the total aqueous binder composition.

In preferred embodiments, the present invention provides improved product and/or binder performance, notably mechanical performance, under wet or humid conditions. This makes the binders particularly suitable where sensitivity to water or humidity is an important criteria, for example wood boards.

It has been found that the phenalkamine component reacts with the carbohydrate component and/or the cross-linker and confers water-resistance properties to the binder through its hydrophobic groups, and hence to the composite product incorporating said binder. As a result, the binder composition of the invention may be used to form a water-resistant silicone-free binder and composite incorporating said binder.

The crosslinker may advantageously be selected from mono- or polycarboxylic acids, including monomeric and polymeric polycarboxylic acids, such as polyacrylates, and nitrogenous components. The nitrogenous component may be selected from $NH_3$, an inorganic amine or an organic amine comprising at least one primary amine group, as well as salts thereof. It may comprise $NH_3$ used as such (e.g. in form of an aqueous solution), or an inorganic or organic ammonium salt, for example ammonium sulfate ($AmSO_4$), ammonium phosphate, e.g. diammonium phosphate, ammonium chloride, ammonium nitrate or ammonium citrate. The nitrogenous component may also be a polyamine, that is any organic compound having two or more amine groups, which may independently be substituted or unsubstituted. For example, the polyamine may be a primary polyamine. As used herein, a "primary polyamine" is an organic compound having two or more primary amine groups ($-NH_2$). Within the scope of the term primary polyamine are those compounds which can be modified in situ or isomerize to generate a compound having two or more primary amine groups ($-NH_2$). The primary polyamine may be a molecule having the formula $H_2N-Q-NH_2$, wherein Q is an alkanediyl, cycloalkanediyl, heteroalkanediyl, or cycloheteroalkanediyl, each of which may be optionally substituted. For example, Q may be an alkanediyl group selected from $-C_2-C_{24}-$, an alkanediyl group selected from $-C_2-C_9-$, or an alkanediyl group selected from $-C_3-C_7-$. According to a preferred embodiment, Q is a $C_6$ alkanediyl. According to another embodiment, Q may be a cyclohexanediyl, cyclopentanediyl or cyclobutanediyl, or a divalent benzyl radical. In this context, it should be noted that certain authors prefer using the term "alkyl" instead of the chemically more correct "alkanediyl" nomenclature; the same chemical group is meant. As used herein, the term "alkanediyl" means a chain of carbon atoms, which may optionally be branched, preferably of limited length, including $-C_1-C_{24}-$, $-C_1-C_{12}-$, $-C_1-C_8-$, $-C_1-C_6-$, and $-C_1-C_4-$. Shorter alkanediyl groups may add less lipophilicity to the compound and accordingly will have different reactivity towards the reducing sugar reactant and/or solubility.

As used herein, the term "cycloalkanediyl" means a chain of carbon atoms, which may optionally be branched, where at least a portion of the chain is cyclic and also includes polycyclic structures, for example, cyclopropanediyl, cyclopentanediyl, cyclohexanediyl, 2-methylcyclopropanediyl, 2-ethylcyclopentanediyl, adamantanediyl. Furthermore, the chain forming cycloalkanediyl is advantageously of limited length, including $-C_3-C_{24}-$, $-C_3-C_{12}-$, $-C_3-C_8-$, $-C_3-C_6-$, and $-C_5-C_6-$. Shorter alkanediyl chains forming cycloalkanediyl may add less lipophilicity to the compound and accordingly will have a different behaviour.

As used herein, the term "heteroalkanediyl" means a chain of atoms that includes both carbon and at least one heteroatom, and is optionally branched. Examples of such heteroatoms include nitrogen, oxygen, and sulfur. In certain variations, said hetero-atoms also include phosphorus, and selenium. In one embodiment, the heteroalkanediyl is a polyether. As used herein, the term "cycloheteroalkanediyl", includes a chain of atoms that includes both carbon and at least one heteroatom, such as heteroalkanediyl, and may optionally be branched, where at least a portion of the chain is cyclic. Particularly, examples of cycloheteroalkanediyl include divalent tetrahydrofuryl, pyrrolidinyl, tetrahydropyranyl, piperidinyl, morpholinyl, piperazinyl, homopiperazinyl, quinuclidinyl.

"Optionally substituted" means the replacement of one or more hydrogen atoms with other functional groups. Such other functional groups may include amino, hydroxyl, halo, thiol, alkyl, haloalkyl, heteroalkyl, aryl, arylalkyl, arylheteroalkyl, nitro, sulfonic acids and derivatives thereof, carboxylic acids and derivatives thereof.

The primary polyamine may be a diamine, triamine, tetramine, or pentamine, for example: a triamine selected from a diethylenetriamine, 1-piperazineethanamine, or bis(hexamethylene)triamine; triethylenetetramine; or tetraethylenepentamine. One feature of the primary polyamine is that it may possess low steric hindrance. For example, 1,2-diaminoethane, 1,4-diaminobutane, 1,5-diaminopentane, 1,6-diaminohexane, 1,12-diaminododecane, 1,4-diaminocyclohexane, 1,4-diaminobenzene, diethylenetriamine, triethylenetetramine, tetraethylenepentamine, 1-piperazine-ethanamine, 2-methyl-pentamethylenediamine, 1,3-pentanediamine, and bis(hexamethylene)triamine, as well as 1,8-diaminooctane have low steric hindrance.

Preferably, the nitrogenous component comprises or consists of 1,6-diaminohexane (hexamethylenediamine, HMDA) or 1,5-diamino-2-methylpentane (2-methyl-pentamethylenediamine.

In another embodiment, the nitrogenous component comprises or consists of a polyether-polyamine, which may be a diamine or a triamine, for example a trifunctional primary amine having an average molecular weight of 440 known as Jeffamine T-403 Polyetheramine (e.g. Huntsman Corporation). In yet another embodiment, the nitrogenous component may comprise or consist of a polymeric polyamine, for example chitosan, polylysine, polyethylene imine, poly(N-vinyl-N-methyl amine), polyaminostyrene, polyvinyl amine (which can be a homopolymer or a copolymer). Proteins, such as whey protein or soy protein, may also be used.

The binder composition may comprise a binder composition as described in any of WO 2007/014236, WO 2009/019232, WO 2009/019235, WO 2011/138458, WO 2011/138459 or WO 2013/150123, each of which is hereby incorporated by reference.

In the binder composition, the carbohydrate component is advantageously present in an amount ranging from 30%, preferably from 40%, preferably from 50%, more preferably from 60%, more preferably from 70%, even more preferably from 80% by dry weight of the binder composition, to less than 97% more preferably less than 95% by dry weight of the binder composition.

The crosslinker may make up:

less than 50% or 40%, preferably less than 30%, more preferably less than 25% by dry weight of the binder composition; and/or at least 2.5%, preferably at least 5%, more preferably at least 10% by dry weight of the binder composition.

The binder composition may comprise at least 25%, and preferably at least 40%, at least 50% or at least 60% by dry weight of: (a) carbohydrate component and crosslinker and/or (b) curable reaction product(s) of carbohydrate component and crosslinker.

When the carbohydrate is a reducing sugar and the crosslinker is an amino compound, the ratio of carbonyl groups in the reducing sugar reactant(s) to reactive amino groups in the nitrogen-containing reactant(s) may be in the range of 5:1 to 1:2. For example, the ratio of carbonyl groups to reactive amino groups may be in the range of 5:1 to 1:1.8, 5:1 to 1:1.5, 5:1 to 1:1.2, 5:1 to 1:1, 5:1 to 1:0.8 and 5:1 to 1:0.5. Further examples include ratios such as 4:1 to 1:2, 3.5:1 to 1:2, 3:1 to 1:2, 2.5:1 to 1:2, 2:1 to 1:2 and 1.5:1 to 1:2. In this context, the term "reactive amino group" means any amino group in the crosslinker which is capable of reacting with the carbohydrate component. Specifically, examples of such reactive amino groups include primary and secondary amino groups, amide groups, imine and imide groups, as well as cyanate and isocyanate.

The crosslinker and the reducing sugar reactant(s) (or their reaction product(s)) may be Maillard reactants that react to form Maillard reaction products, notably melanoidins when cured. Curing of the binder composition may comprise or consist essentially of Maillard reaction(s). The cured binder is preferably a thermoset binder and is preferably substantially water insoluble.

The reducing sugar reactant may comprise: a monosaccharide, a monosaccharide in its aldose or ketose form, a disaccharide, a polysaccharide, a triose, a tetrose, a pentose, xylose, an hexose, dextrose, fructose, a heptose, a sugar, molasses, starch, starch hydrolysate, cellulose hydrolysates, reaction product(s) thereof or mixtures thereof as well as non-reducing sugars and derivatives thereof that generate a reducing sugar in situ, like sucrose or molasses. The reducing sugar reactant(s), or carbohydrate reactant(s) that yield the reducing sugar reactant(s) may have a dextrose equivalent of at least about 50, at least about 60, at least about 70, at least about 80 or at least about 90. The reducing sugar reactant may comprise or consist of high fructose corn syrup (HFCS).

The binder composition may comprise one or more adjuvants, for example waxes, dyes, dedusters, release agents and formaldehyde scavengers (notably urea, tannins, quebracho extract, ammonium phosphate bisulfite). It may further comprise, if so desired, appropriate catalysts that catalyse the reaction between carbohydrate component and crosslinker. Such catalysts may be selected from known catalysts, such phosphorous containing salts or acids. Examples are sodium hypophosphite, phosphates etc.

The binder composition is preferably free of, or comprises no more than 5 wt % or no more than 10 wt % urea formaldehyde (UF), melamine urea formaldehyde (MUF) and/or phenol formaldehyde.

The binder composition preferably does not comprise any added formaldehyde. It may be "substantially formaldehyde free", that is to say that it liberates less than 5 ppm formaldehyde as a result of drying and/or curing (or appropriate tests simulating drying and/or curing); more preferably it is "formaldehyde free", that is to say that it liberates less than 1 ppm formaldehyde in such conditions.

The binder composition of the invention may be applied to wood particles, abrasive particles, sheet material, or fibers, which may then be subjected to heat and/or pressure to cure the components of the binder composition in order to form a cured thermoset binder resin which holds the particles, sheet or fibers together in a composite material.

The binders of the invention may be used to bond a collection of non or loosely assembled matter. The collection of matter includes any collection of matter which comprises fibers selected from mineral fibers, slag wool fibers, stone wool fibers, glass fibers, aramid fibers, ceramic fibers, metal fibers, carbon fibers, polyimide fibers, polyester fibers, rayon fibers, and cellulosic fibers. Further examples of collection of matter include particulates such as coal, sand, cellulosic fibers, wood shavings, saw dust, wood pulp, ground wood, wood chips, wood strands, wood layers, other natural fibers, such as jute, flax, hemp, straw, wood veneers, facings and other particles, woven or non-woven materials. According to a specific embodiment of the invention, the collection of matter is selected from wood particles and mineral fibers.

In one illustrative embodiment, the binder composition of the invention may be used to make thermal insulation products, comprising mineral fibers. In such an application, the fibers are bonded together such that they become organized in a fiberglass mat which may then be processed into an insulation product. In such an application, the fibers are generally present in an amount ranging from 70 to 99% by total weight of the insulation product, notably from 80 to 99% or from 85 to 99%.

According to another embodiment of the invention, the binder may be used to bond cellulosic particles, such as cellulosic fibers, wood shavings, wood pulp and other materials commonly used to manufacture composite wood boards, including fiber boards, particle boards, oriented strand boards, plywood etc. Such wood boards show nominal thicknesses ranging from 6 to 30 mm and a modulus of Elasticity of at least about 1000 N/mm2, bending strength of at least about 5 N/mm2 and/or an internal bond strength of at least 0.10 N/mm2. In such applications, the binder content in the final wood board may range from about 5 to 30% wt with respect to the total weight of the wood board notably from 9 to 20%.

The aqueous binder composition may be applied onto the fiber or particulate material by spray application. Other possible techniques include roll application or mixing and/or tumbling the collection of matter with the binder composition. As water evaporates the binder composition may form a gel that bonds the particulate material together when arranged into a desirable assembly. When curing, the polyphenolic macromolecular compound and the polyamine functional compound are caused to react to form an essentially water insoluble macromolecular binder. Curing thus imparts increased adhesion, durability and water resistance as compared to uncured binder. Curing may be effected at temperatures between ambient and up to 280° C.

The invention will be described here below with reference to examples and Figures.

In the Figures:

FIG. 3 shows water absorption data for an invention composition compared to a known composition; and FIG. 4 shows water absorption data for an invention binder composition compared to a binder composition comprising a silicone water repellent.

As mentioned earlier, the phenalkamine component appears to confer water-resistance properties to the binder incorporating it and to composite materials made with the invention binder. The advantageous properties of invention binder compositions and composite materials will be shown in more details herein below.

EXAMPLE 1

Glucose and ammonium sulphate were dissolved in water individually and combined at ambient temperature under stirring such as to obtain a glucose:ammonium sulphate ratio of 85:15 wt %, based on dry weight. A fraction of the obtained composition was retained as control (control 1). Another fraction was withdrawn and 3 wt % of polydimethylsiloxane based water repellent (Basildon Chemicals BC2631 which is a co-emulsion of blended reactive polydimethylsiloxanes for use on glass wool and mineral substrates) were added (based on dry weight) to form control 2. A further fraction of the initial binder composition was withdrawn and 3 wt % phenalkamine (RAC950 supplied by Royce International) were added as a 10% dispersion in water (B1). To a further fraction, 1.5 wt % BC2631 and 1.5 wt % RAC950 as a 10% aqueous dispersion were added (B2).

Figure 1:
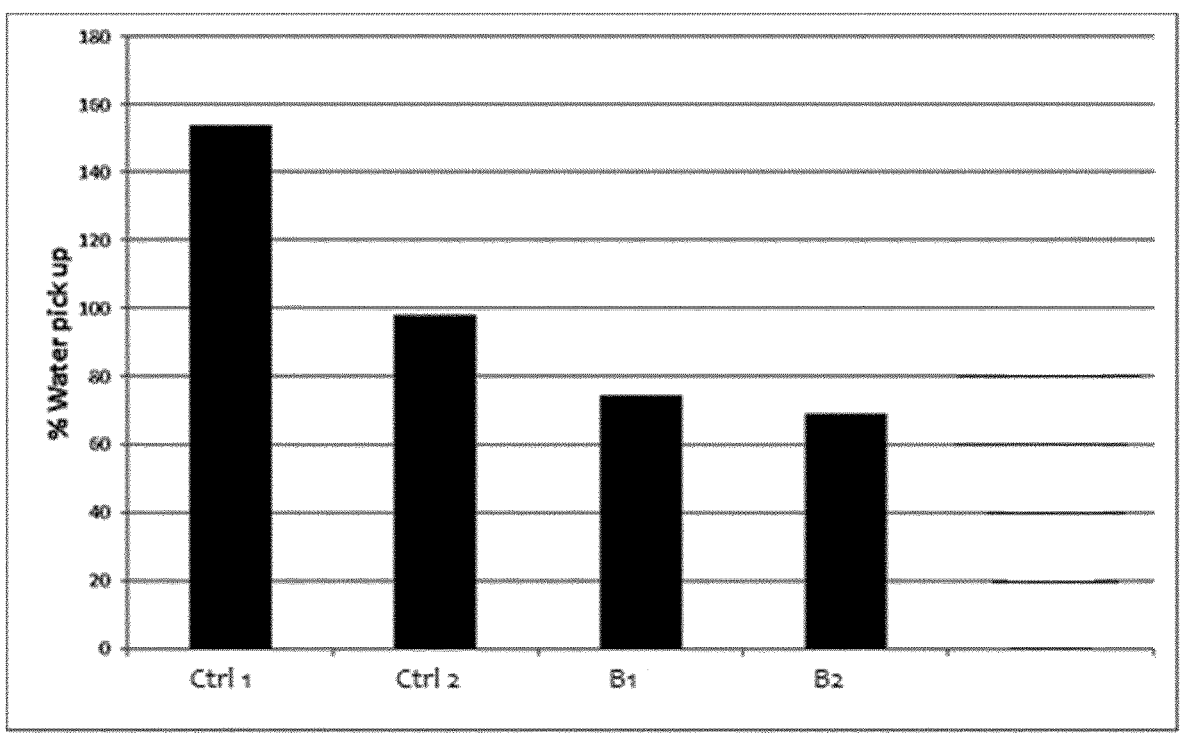
FIG. 1 shows water absorption data for various binder compositions.

The binder compositions were applied onto a glass microfiber Whatman GF/A filter as follows: the glass filter was completely submerged for 5 seconds into a binder composition, fixed with a wire. The glass filter was then withdrawn and suspended in a frame placed in a drying oven at 200° C. for 10 min. After curing, the filter was weighted. The obtained composite product (bonded glass filter) was placed into a 400 ml beaker and 200 ml water were added. A glass rod was placed on top of the filter and the filter was left submerged in water for 1 hour. After 1 hour, the filter was withdrawn and water allowed to drip for 2 minutes. Excess water was removed using absorbent paper. The filter was weighted again. Water absorption (%) is calculated as 100× (mass wet filter–mass dry filter)/mass dry filter. The test results are summarized in FIG. 1.

As can be seen, and as expected, the addition of siloxane based water-repellent additive significantly reduces water uptake (compare control 1 and control 2). The addition of phenalkamine even further reduces water uptake (compare B1 and control 1). The combination of silicon based water repellent and phenalkamine performs similarly to the sole phenalkamine additive (see B2).

Figure 2:
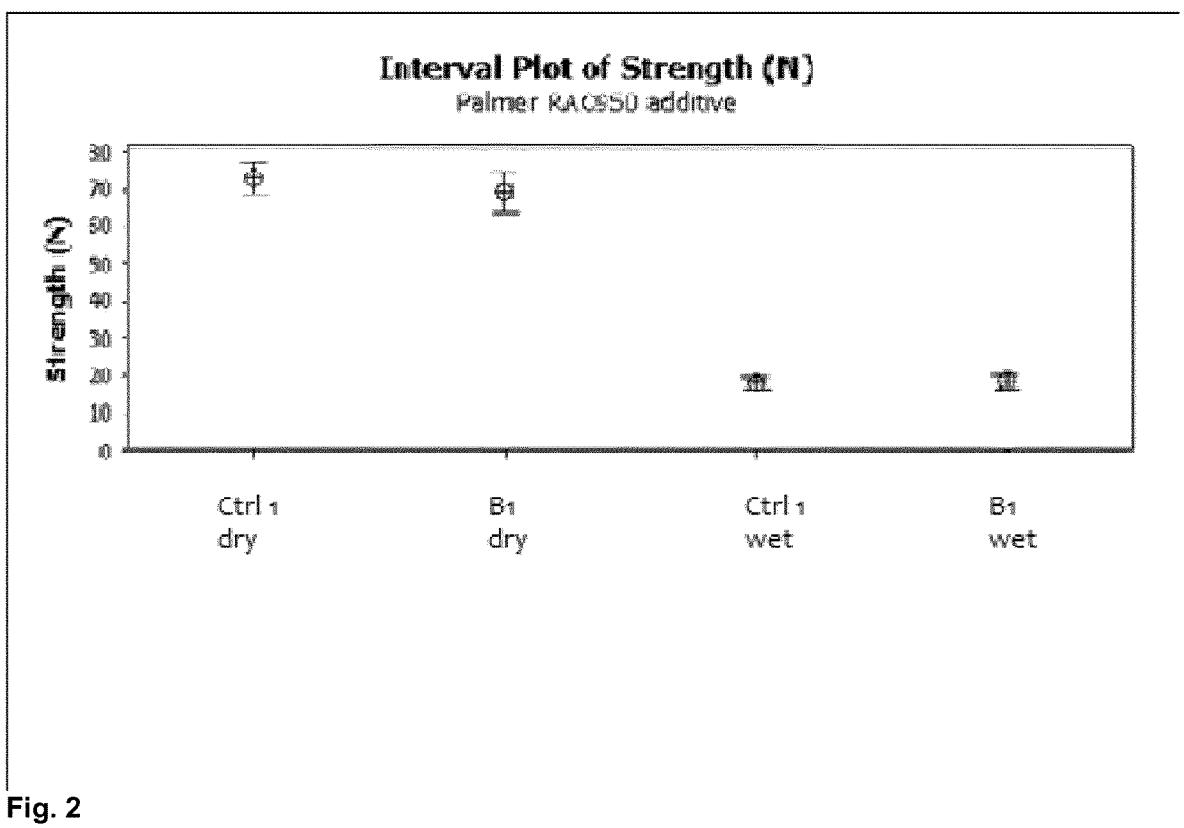
FIG. 2 shows an interval plot of strength diagram for various binder compositions.

The compositions Control 1 and B1 were subjected to dry and wet tensile strength tests as follows: suitable strips of impregnated and cured glass veils were placed onto a testometric machine (M350-10CT) and tested using a 50 kg load cell at an automated test speed of 10 mm/min controlled by winTest Analysis software. Various parameters such as maximum load at peak, stress at peak and modulus (stiffness) were evaluated by the software, and data presented as an average of 8 samples with standard deviation. The average maximum load at peak or stress at peak defined as the bond strength. For the wet test, the cured veil samples were placed in an autoclave (J8341, Vessel: PV02626 with associated safety valve, door interlock and integrated pipework) system. Samples were treated at 90% humidity and at a temperature ranging from 40° C. to 110° C. (full cycle), at a pressure of up to 2.62 bar, for 3 hours. The samples were dried completely in order to ensure no moisture remains onto the veils. The autoclave treated samples were tested for bond strength by means of testometric machine (M350-10CT) described here above, and the results were compared with those of untreated samples. The test results are summarized in FIG. 2. The addition of phenalkamine does not significantly impact the tensile strength.

EXAMPLE 2

The same experiment was repeated with a binder composition comprising glucose and HMDA (hexamethylenediamine) in 85/15 ratio (B4) and a binder composition comprising glucose and HMDA (hexamethylenediamine) in 85/15 ratio plus 3 wt % phenalkamine (RAC950) added (B5) as a 10% aqueous dispersion. The results are shown in FIG. 3.

EXAMPLE 3

Example 1 was repeated with a binder composition comprising glucose and ammonium sulphate in a ratio of 85:15 wt %, based on dry weight. A fraction of the obtained composition was retained as control. Another fraction was withdrawn and 1 wt % of polydimethylsiloxane based water repellent (Basildon Chemicals BC2631 which is a co-emulsion of blended reactive polydimethylsiloxanes for use on glass wool and mineral substrates) were added (based on dry weight) to form a second control. A further fraction of the initial binder composition was withdrawn and 0.5 wt % phenalkamine (RAC950 supplied by Royce International) were added as a 10% dispersion in water together with 0.5 wt % of the above polydimethylsiloxane.

The water pick-up results are shown in FIG. 4. Clearly, the combination of silicone based water repellent and phenalkamine show improved water pick-up characteristics as compared to just silicone water repellent.

What is claimed is:

1. An aqueous binder composition comprising a carbohydrate component, optionally comprising a crosslinker and optionally comprising a reaction product of the carbohydrate component and the crosslinker, wherein the aqueous binder composition further comprises a phenalkamine comprising the general formula

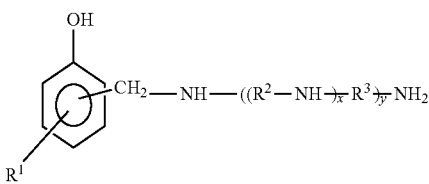

wherein R¹ comprises a straight or branched, saturated or unsaturated alkyl group comprising 12-24 C-atoms;
R² and R³ comprise linear or branched alkanediyl comprising 2-20 C-atoms, cycloaliphatic groups or comprise aromatic groups;
and
x comprises an integer ranging from 0-5 and y comprises an integer ranging from 1-5.

2. The aqueous binder composition of claim 1, wherein R¹ is $C_{15}H_{(31-n)}$ wherein n is 0, 2, 4, or 6.

3. The aqueous binder composition of claim 1, wherein R² and R³ are each ethanediyl and x and y are each 1, or a phenalkamine of the general formula of claim 1 wherein R³ is ethanediyl, x is 0 and y is 1.

4. The aqueous binder composition of claim 1, wherein the phenalkamine comprises 0.5-30 wt. %, based on the dry weight of the aqueous binder composition, optionally in combination with a silicone or silane comprising water repellent.

5. The aqueous binder composition of claim 1, wherein the carbohydrate component is selected from the group consisting of monosaccharides, disaccharides, oligosaccharides polysaccharides, in situ precursors thereof and mixtures thereof.

6. The aqueous binder composition of claim 1, wherein the crosslinker is selected from a polycarboxylic acid, salt, ester and/or anhydride derivatives thereof, and/or a nitrogenous component.

7. The aqueous binder composition of claim 6, wherein the crosslinker comprises an ammonium salt of an inorganic acid or of a carboxylic acid, or a polyamine having at least two primary amine functionalities.

8. The aqueous binder composition of claim 1, wherein the carbohydrate component comprises a concentration ranging from 30 wt. % by dry weight of the aqueous binder composition to less than 97 wt. % by dry weight of the aqueous binder composition.

9. The aqueous binder composition of claim 1, wherein the crosslinker comprises less than 50 wt. % by dry weight of the aqueous binder composition and/or at least 2.5 wt. % by dry weight of the aqueous binder composition.

10. A binder produced by subjecting the aqueous binder composition of claim 1 to drying and optionally curing conditions, wherein the phenalkamine is chemically reacted with the carbohydrate component and/or the crosslinker.

11. A composite product comprising particulate material, fibers and/or sheet material bonded together by the aqueous curable binder composition of claim 10.

12. The composite product of claim 11, wherein the composite product is present in an insulation material comprising mineral fibers.

13. The composite product of claim 11, wherein the composite product is present in a wood particle board, a chip board, a wood fiber board or plywood.

14. A process for manufacturing a composite product comprising
providing an assembly of particulate material, chips, fibers, or sheet material, applying the aqueous binder composition of claim 1 to the assembly for forming a resinated material, and
subjecting the resinated material to heat and/or pressure for drying and optionally curing the aqueous curable binder composition.

15. An aqueous binder composition comprising a carbohydrate component, optionally a crosslinker and optionally a reaction product of the carbohydrate component with the crosslinker, and a phenalkamine comprising the general formula

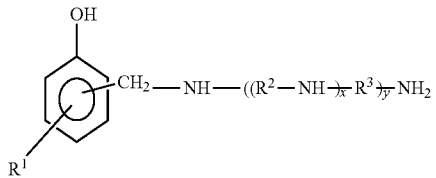

wherein R¹ is a straight or branched, saturated or unsaturated alkyl group comprising 12-24 C-atoms,
R² and R³ are linear or branched alkanediyl comprising 2-20 C-atoms, cycloaliphatic groups or contain aromatic groups,
x is an integer ranging from 0-5, and y is an integer ranging from 1-5, and
the phenalkamine component comprises 0.5-30 wt. %, based on dry weight of the aqueous binder composition.

16. The aqueous binder composition of claim 15, wherein the carbohydrate component is selected from the group consisting of monosaccharides, disaccharides, oligosaccharides polysaccharides, in situ precursors thereof and mixtures thereof,
the crosslinker is selected from the group consisting of carboxylic acid, salt, ester anhydride derivatives thereof, an ammonium salt of an inorganic acid, a carboxylic acid and a polyamine comprising at least two primary amine functionalities, and
wherein the carbohydrate component comprises 30 wt. % by dry weight of the aqueous binder composition to less than 97 wt. % by dry weight of the aqueous binder composition.

* * * * *